//  US005562400A

United States Patent [19]
Travis

[11] Patent Number: 5,562,400
[45] Date of Patent: Oct. 8, 1996

[54] SELF-PROPELLED LIFTING APPARATUS

[76] Inventor: Bobby J. Travis, 345 Mayhaw, Vidor, Tex. 77662

[21] Appl. No.: 538,390

[22] Filed: Oct. 25, 1995

Related U.S. Application Data

[63] Continuation of Ser. No. 241,478, May 12, 1994, abandoned.

[51] Int. Cl.$^6$ .................................................. B66F 11/000
[52] U.S. Cl. ...................... 414/745.3; 414/495; 414/559
[58] Field of Search .............................. 414/745.3, 458, 414/459, 460, 495, 498, 559, 507

[56]  References Cited

U.S. PATENT DOCUMENTS

| | | |
|---|---|---|
| 3,567,044 | 3/1971 | Travis . |
| 3,655,081 | 4/1972 | Monk .......................... 414/460 |
| 3,688,931 | 9/1972 | Tax et al. ..................... 414/460 |
| 3,703,243 | 11/1972 | Monk . |
| 3,712,404 | 1/1973 | Walquist . |
| 3,789,929 | 2/1974 | Leidig . |
| 3,792,779 | 2/1974 | Brazell . |
| 3,814,203 | 6/1974 | Gieszl . |
| 3,836,015 | 9/1974 | Travis . |
| 3,935,951 | 2/1976 | Claus et al. . |
| 4,022,428 | 5/1977 | Mantha . |
| 4,053,062 | 10/1977 | Travis . |
| 4,095,335 | 6/1978 | Lassarat . |
| 4,184,425 | 1/1980 | Haney et al. . |
| 4,194,756 | 3/1980 | van der Lely . |
| 4,227,854 | 10/1980 | Coffey . |
| 4,269,427 | 5/1981 | van der Lely . |
| 4,312,124 | 1/1982 | Calhoun . |
| 4,323,398 | 4/1982 | Simon . |
| 4,352,406 | 10/1982 | Fahrenschon . |
| 4,358,242 | 11/1982 | Davies . |
| 4,392,524 | 7/1983 | Bauch . |
| 4,444,287 | 4/1984 | Voelz . |
| 4,549,610 | 10/1985 | van der Lely . |
| 4,575,305 | 3/1986 | Krajicek et al. . |

(List continued on next page.)

FOREIGN PATENT DOCUMENTS 2000715A  1/1979  United Kingdom ................ 414/745.3

OTHER PUBLICATIONS

Brochure for Acme 30 Ton Open End Hoist by Acme Hoist Incorporated.
Brochure for Acme 35 Ton Open End Hoist by Acme Hoist Incorporated.
Brochure for Hull Lev/Ler Control by Acme Hoist Incorporated.
Brochure Acme Boat Hoists by Acme Hoist Incorporated.
Hydro–Extractors, Inc. shipping invoice for, general product description of, and sketch of, the tube bundle extractor referred to in paragraph 3(1) of Applicant's Oct. 3, 1994 Information Disclosure Statement.
Brochure, "The Bundle Wagon" M&H Manufacturing Corporation.
Brochure, American Mechanical Services, Inc. Model Sp–A–101.
Brochure, Serv–Tech, Inc., Fast Draw Bundle Extractor.
Brochure, Peinemann Equipment, Hydraulic Tube Bundle Extractor.
Brochure, Hammelmann Refinery Service System, Extractor Tool.
Brochure, Trouvay & Cauvin, France, Bundle Push–Puller.
Bundle Wagon Parts and Instruction Manual, M & H Manufacturing Corporation.

*Primary Examiner*—Karen B. Merritt
*Assistant Examiner*—Douglas Hess
*Attorney, Agent, or Firm*—Arnold, White & Durkee

[57]  ABSTRACT

A self propelled tube bundle extractor includes a mainframe which has four hydraulically actuated wheel assemblies for propulsion and steering. An extraction frame is mounted on the main frame and is operable to translate in three directions, up and down, forward and backward, and side to side, independent of the movement of the main frame. The vertical movement of the extraction frame is established by at least two telescoping lifting columns.

18 Claims, 17 Drawing Sheets

U.S. PATENT DOCUMENTS

| | | |
|---|---|---|
| 4,666,365 | 5/1987 | Cradeur . |
| 4,763,800 | 8/1988 | Engler et al. . |
| 4,838,438 | 6/1989 | Ishige et al. . |
| 4,869,638 | 9/1989 | Krajicek et al. . |
| 4,877,365 | 10/1989 | Lanigan, Jr. et al. ............... 414/460 |
| 5,018,544 | 5/1991 | Boisture et al. . |
| 5,032,054 | 7/1991 | Krajicek et al. . |
| 5,103,847 | 4/1992 | Martin et al. . |
| 5,114,295 | 5/1992 | Jansson ................................ 414/460 |
| 5,123,806 | 6/1992 | Pankowiecki . |
| 5,169,281 | 12/1992 | Boisture . |
| 5,203,072 | 4/1993 | Boisture . |
| 5,261,600 | 11/1993 | Cradeur . |
| 5,322,410 | 6/1994 | Persinger et al. . |
| 5,323,529 | 6/1994 | Amuny . |

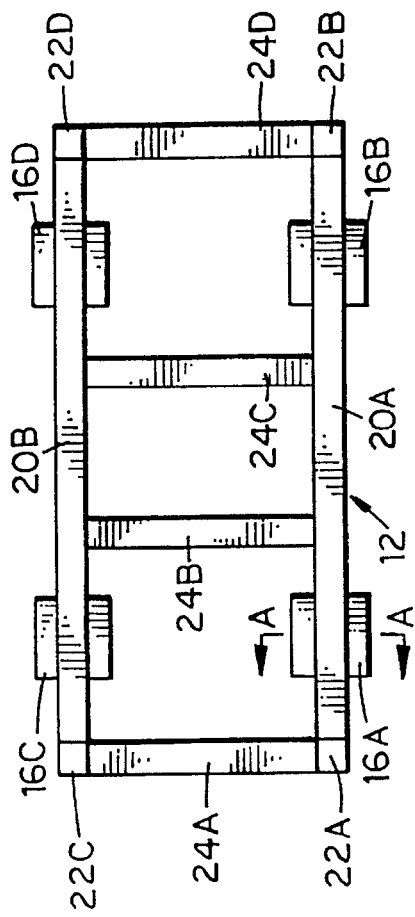
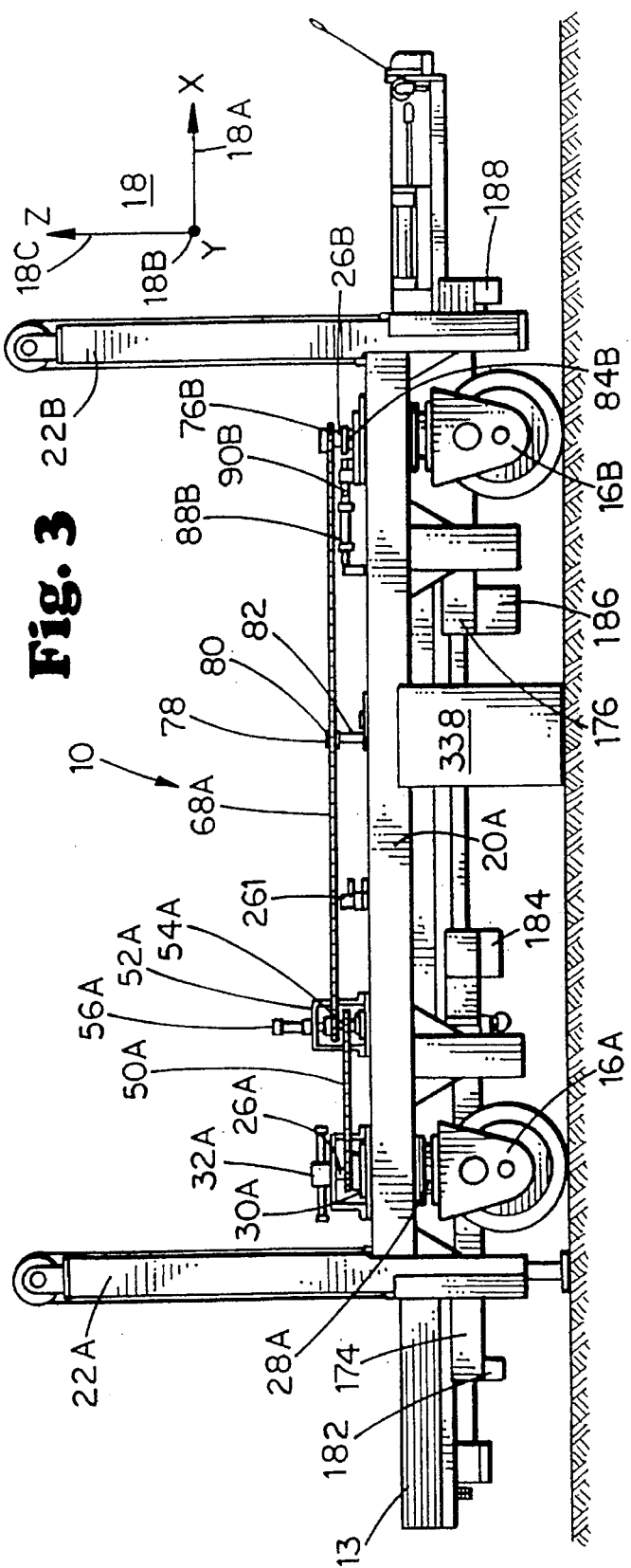

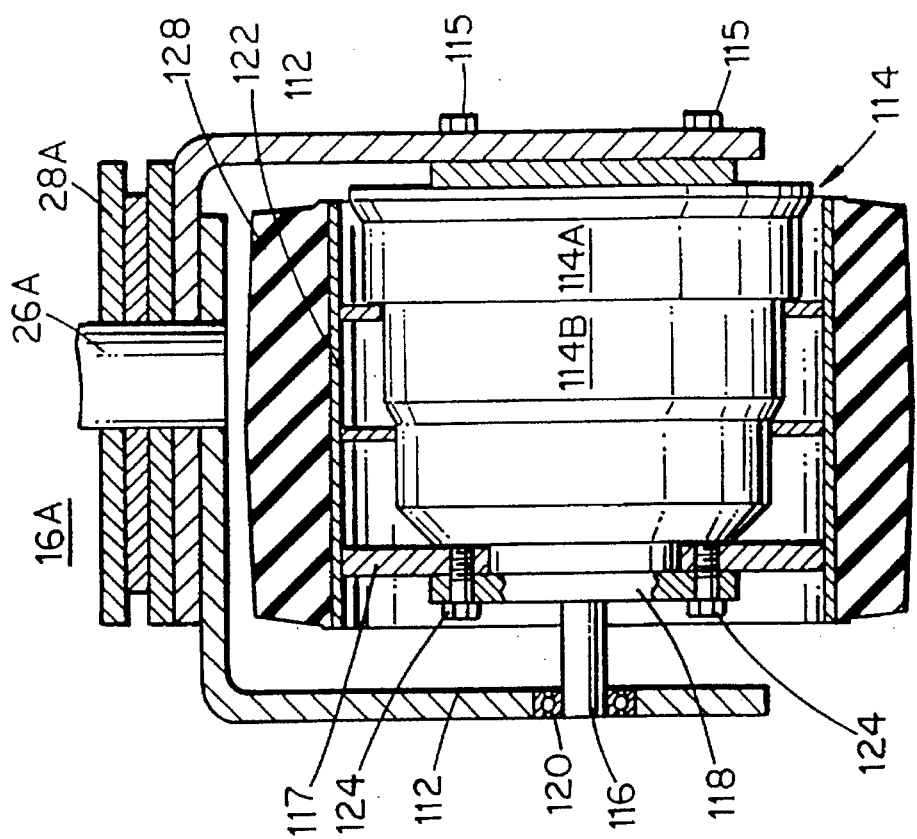
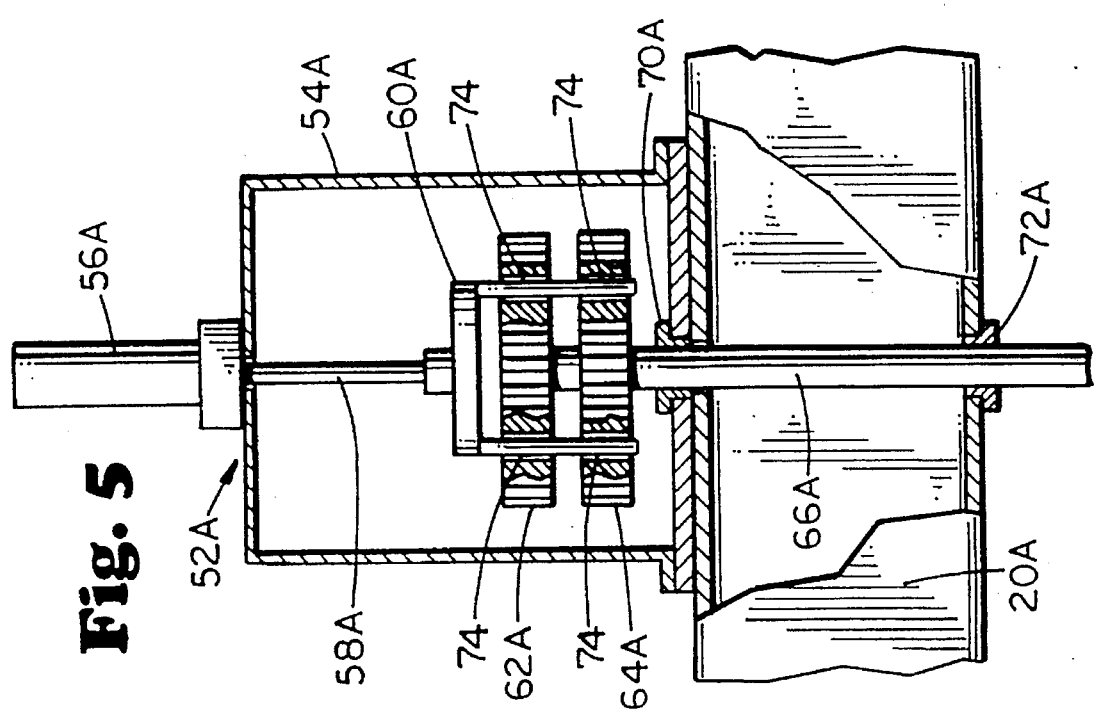

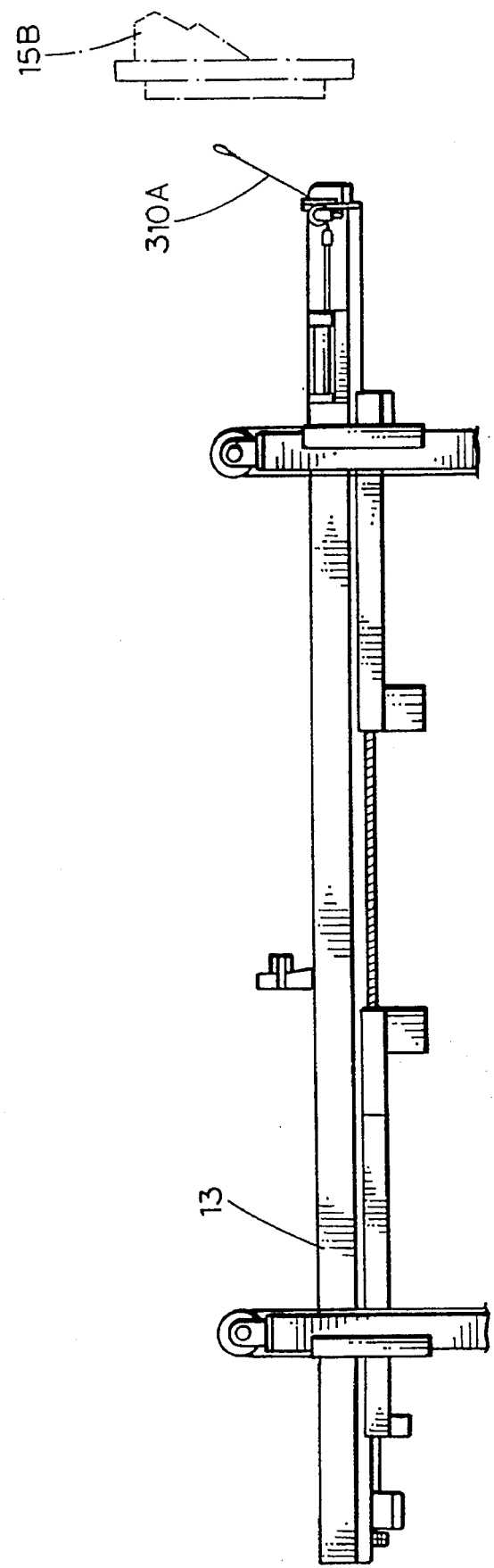

SELF-PROPELLED LIFTING APPARATUS

This application is a continuation of application Ser. No. 08/241,478, filed May 12, 1994, now abandoned.

BACKGROUND OF THE INVENTION

1. Field of the Invention

The present invention relates generally to self-propelled devices capable of raising, lowering, and transporting heavy elongated objects. More particularly, the present invention relates to a self-propelled heat exchanger tube bundle extractor that is capable of removing a heat exchanger tube bundle from an elevated horizontally disposed heat exchanger shell and transporting the tube bundle to another location for maintenance.

A great variety of chemical processing plants utilize large cylindrical heat exchangers. The heat exchangers typically comprise a horizontally disposed cylindrical shell containing a cylindrical tube bundle which is composed of a number of parallel metal tubes. The tube bundles themselves maybe very large, up to 60 ft. in length and weighing up to 100 tons or more.

A heat exchanger channel ordinarily is coupled to the front of each heat exchanger shell. The channel is double flange section of pipe having an inlet and outlet to enable fluid to pass into the heat exchanger tubes, pass through the tube bundle tubes, and exit out the channel either, at a lower or higher temperature, as the case may be.

Large heat exchangers, while having a potential life span of several years, will normally require maintenance at some point in time. Performing maintenance on a large cylindrical heat exchanger normally entails removing the tube bundle and transporting it to another location for maintenance. The down time associated with removing and replacing the heat exchanger tube bundle may represent an added cost of operation to the facility. It is therefore desirable to be able to remove and replace the heat exchanger tube bundle as quickly as possible, and as safely as possible.

The problem of plant down time as a result of tube bundle replacement is exacerbated in situations where two or more heat exchanger shells are stacked on top of one another. If the top tube bundle in such a stacked arrangement requires maintenance, it will be necessary to either dismantle the lower heat exchanger channels in order to reach the top heat exchanger bundle, or to utilize a lifting apparatus that is capable of avoiding the lower heat exchanger channels. If the lower most heat exchanger channel must be removed to be able to position the lifting apparatus next to the heat exchanger bundle that is to be extracted, several heat exchangers at once will be taken off line, resulting in a much higher down time cost for maintenance.

Some chemical plants place further constraints on the removal of heat exchanger tube bundles. For example, in some circumstances, the arrangement of piping at or near the heat exchanger shell may provide very little room to maneuver an apparatus in position to remove the failing tube bundle. In such applications, it is desirable to have an extractor apparatus that is not only self-propelled, but able to make fine tuned adjustments along either an X, Y or Z axis in order to avoid any obstacles presented by the plant hardware and to be able to more quickly and accurately align the tube bundle.

2. Brief Description of the Prior Art

The prior art contains a number of self-propelled heat exchanger tube bundle extractors such as Cradeur, U.S. Pat. No. 4,666,365, Krajicek, U.S. Pat. No. 4,575,305, Bauch, U.S. Pat. No. 4,392,524, Boisture, U.S. Pat. No. 5,169,281.

These devices typically utilize a risible boom or telescoping column mounted on a vehicle chassis of some sort. These devices, while providing a self-propelled capability, have the disadvantage of introducing cantilevered forces on the lifting system which introduce instability into the system when the tube bundle is lifted out of the tube shell. Even providing large counterweights on the vehicle chassis to counteract the moments introduced by the offset between the center of gravity of the tube bundle and the lifting boom or telescoping column may not be sufficient to successfully overcome the moments.

Another set of prior art devices utilizes a wheel mounted frame work that is wheeled into position adjacent the tube bundle. When the desired position is reached, the entire frame work is elevated on a series of outriggers either by hydraulic means or by chains and pulleys. These devices, for example, the American Mechanical Services, Inc., Model SP-A-101 and the M&H Manufacturing Corporation's bundle wagon do not suffer from the same cantilever force problems that the earlier mentioned systems do, however, they too have inherent disadvantages. For example, the bundle wagon is not self-propelled, and thus requires a separate vehicle for transport and positioning. Furthermore, both the bundle wagon and the SP-A-101, once positioned, and elevated, i.e., along a Z-axis, cannot be translated along either an X or Y axis. Consequently, if it turns out that such systems must be adjusted in either an X or Y direction after the units have been elevated, the units must then be lowered back to ground level, repositioned, and then raised again.

The present invention is directed to overcoming one or more of the aforementioned disadvantages.

In one aspect of the present invention, a lifter for transporting an elongated object over a surface comprises an elongated main frame that has at least two lifting columns that are vertically disposed in spaced apart relation. At least four wheels are pivotally coupled to the main frame. The wheels are controllably operable to propel and steer the lifter and to remain in contact with the surface. An extraction frame is coupled to the lifting columns and is controllably movable with respect to the main frame along a first predetermined path, a second predetermined path, and a third predetermined path. A pulling device is controllably movable along a fourth predetermined path parallel to the first predetermined path to selectively pull the object on to and push the object off of the extraction frame.

In another aspect of the present invention, a lifter for transporting an elongated object over a surface comprises an elongated main frame that has a pair of parallel beams that extend generally parallel to an X-axis. At least one cross member is coupled to the beams and extends generally parallel to a Y-axis. At least two parallel lifting columns are coupled to the beams and extend generally parallel to a Z-axis. At least four wheels are pivotally coupled to the main frame. The wheels are controllably operable to pivot 360° and to translate the lifter and to remain in contact with the surface. An extraction frame is slidably coupled to the lifting columns to permit translation of the extraction frame parallel to the Z-axis. The extraction frame has first and second parallel members that extend generally parallel to the X-axis. In addition, the extraction frame has a plurality of parallel spars that are disposed on the extraction frame and that extend generally parallel to the Y-axis. The parallel members are controllably movable parallel to the Y-axis and controllably movable to the X-axis. A pulling car is slidably mounted on the parallel members of the extraction frame. The pulling car has an interior and is controllably movable parallel to the X-axis to selectively pull the object on to and push the object off of the extraction frame. A lifting mechanism is coupled to the main frame. The lifting mechanism is controllably operable to translate the extraction frame parallel to the Z-axis. A drive mechanism that has a drive shaft is coupled to the pulling car and to the extraction frame. The drive mechanism is controllably operable to translate the pulling car parallel to the X-axis. A first translating mechanism is coupled to the extraction frame. The first translating mechanism is operable to translate the parallel members parallel to the Y-axis. A second translating mechanism is coupled to the extraction frame. The second translating mechanism is operable to translate the parallel members parallel to the X-axis.

BRIEF DESCRIPTION OF THE DRAWINGS

Advantages of the invention will become apparent upon reading the following detailed description and references to the drawings in which:

FIG. 2 depicts an exemplary mainframe with extraction frame removed, illustrated in a top view.

FIG. 3 depicts an exemplary tube bundle extractor, illustrated in a side view.

FIG. 5 depicts an exemplary sprocket lock mechanism of tube bundle extractor illustrated in a sectional view.

FIG. 7 depicts an exemplary wheel assembly, illustrated in a sectional view taken at Section A—A from FIG. 1.

FIG. 20 depicts an exemplary extraction frame in an elevated position, illustrated in a side view.

DESCRIPTION OF THE PREFERRED EMBODIMENTS

Figure 1:
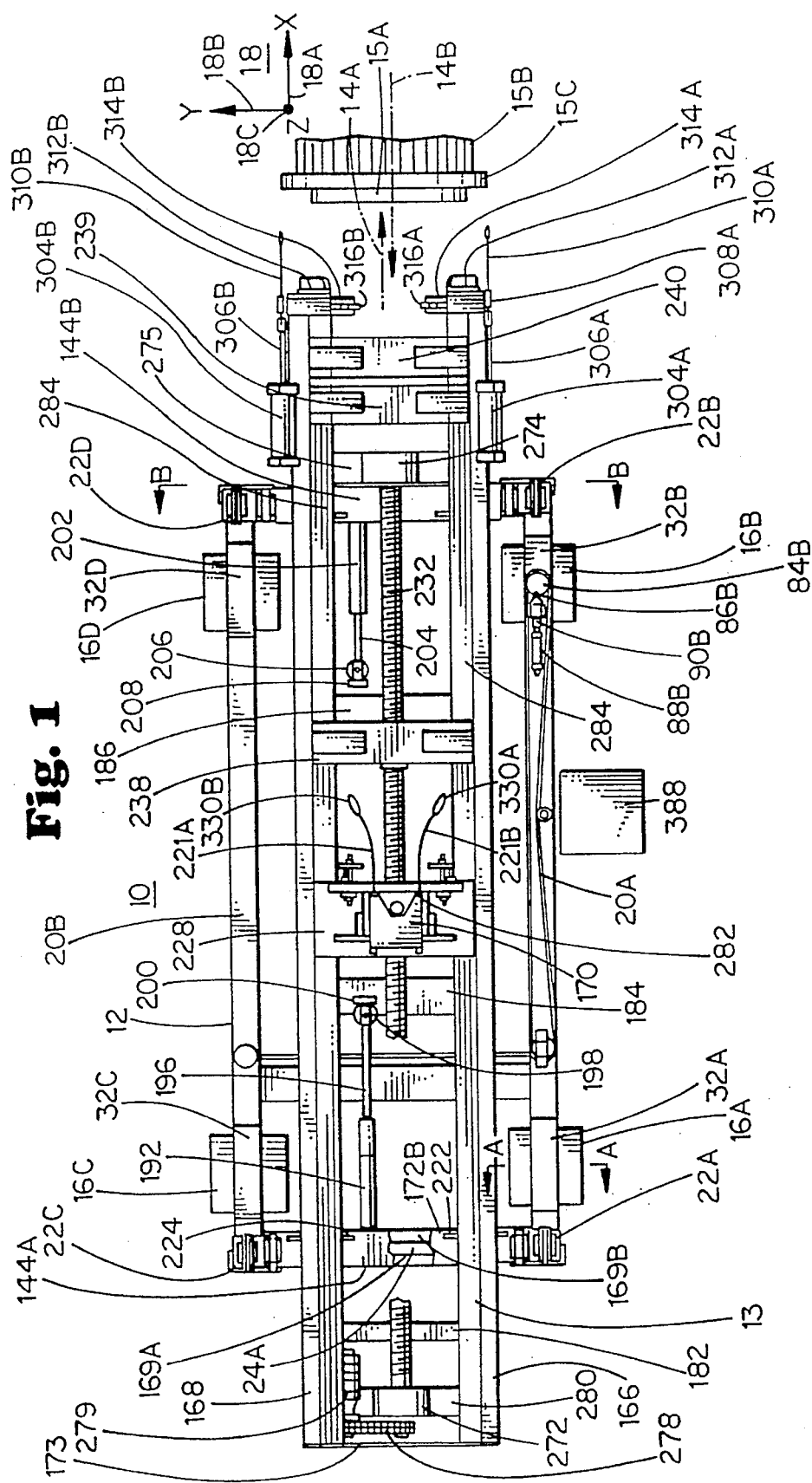
FIG. 1 depicts an exemplary tube bundle extractor, illustrated in a top view.

FIG. 1 shows a top view of a preferred embodiment of the tube bundle extractor 10 which includes a mainframe 12 and an extraction frame 13. Tube bundle extractor 10 is positioned with its centerline 14A at a slight misalignment with the centerline 14B of a tube bundle 15A which is shown in place within tube shell 15B, flush with tube shell flange 15C. Mainframe 12 includes wheel assemblies 16A–D which, as discussed more fully below, provide both propulsion and directional steering. As discussed more fully below, the mainframe 12 is intended to remain stationary, while extraction frame 13 is intended to translate parallel to the X, Y and Z axes 18A, 18B, and 18C shown on three dimensional axis 18.

Referring now also to FIG. 2, which is a top view of mainframe 12 with extraction frame 13 removed, mainframe 12 is preferably composed of a pair parallel beams 20A and 20B that are connected to four vertically disposed lifting columns 22A–D. Mainframe 12 includes transverse beams 24B and 24C which respectively span between parallel beams 20A and 20B. Transverse beams 24A and 24D respectively span between lifting columns 22A and 22C, 22B and 22D. Transverse beams 24A–D, and parallel beams 20A and 20B are preferably of rectangular cross-section.

Referring now to also FIG. 3, which is a side view of tube bundle extractor 10 with extraction frame 13 in its lowered position, mainframe 12 is supported by wheel assemblies 16A–D. Wheel assemblies 16A and 16B are pivotally coupled to parallel beam 20A by shafts 26A and 26B and wheel assemblies 16C–D are pivotally coupled to parallel beam 20B by shafts 26C–D. The shafts 26C–D are not shown but are substantially identical to shafts 26A and 26B. The following discussion will focus on wheel assembly 16A, however, the discussion will be generally applicable wheel assemblies 16B–D.

A bearing 28A separates wheel assembly 16A from parallel beam 20A. Shaft 26A extends from wheel assembly 16A through bearing 28A and housing 30A, terminating at steering drive 32A.

Figure 4:
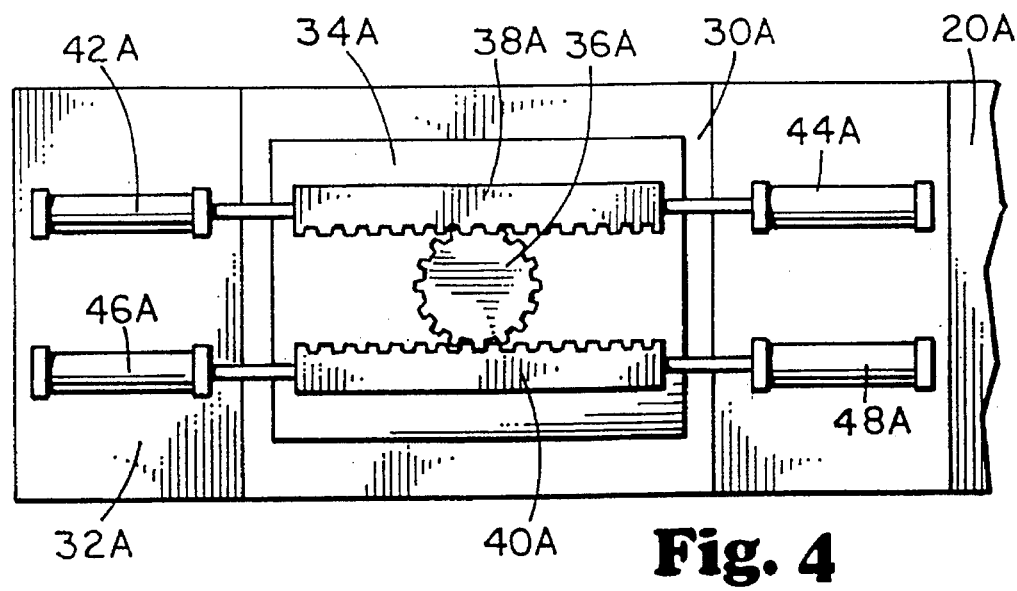
FIG. 4 depicts an exemplary steering drive of tube bundle extractor, illustrated in a cutaway top schematic view.

The structure and operation of steering drive 32A can be better understood by reference to FIG. 4, which is a cutaway top schematic view of steering drive 32A, and is exemplary of the structure of steering drives 32B–D. As can be seen from FIG. 4, a gear box 34A is mounted on top of housing 30A. The top of gear box 34A is shown cut away to reveal pinion 36A that is coupled to the top of shaft 26A. Pinion 36A meshes with rack 38A and rack 40A. Rack 38A is coupled to fluidic cylinders 42A and 44A which cooperatively extend and retract to translate rack 38A back and forth. Similarly, rack 40A is coupled to fluidic cylinders 46A and 48A which cooperatively extend and retract to translate rack 40A back and forth. The combined action of racks 38A and 40A mesh with pinion 36A to selectively rotate shaft 26A, thereby pivoting wheel assembly 16A to provide directional steering thereof. While it would be possible to provide directional steering of wheel 16A with only a single rack, such as 38A, to interact with pinion 36A, it is anticipated that the heavy torque requirements associated with overcoming large friction forces on wheel assembly 16A necessitate a dual rack arrangement.

The following discussion focuses on wheel assemblies 16A and 16B and the structure utilized to couple and decouple the movements of wheel assemblies 16A and 16B however, the discussion is applicable wheels 16C and 16D as well since there is identical coupling/decoupling structure for wheel assemblies 16C and 16D.

Chain 50A couples shaft 26A to sprocket lock mechanism 52A as shown in FIG. 3. Chain is preferably a typical double roller chain. Referring now also to FIG. 5, which is a sectional view of sprocket lock mechanism 52A, sprocket lock mechanism 52A is designed to selectively couple and decouple the pivoting movements of wheel assemblies 16A and 16B. Sprocket lock mechanism 52A comprises a housing 54A that is coupled to parallel beam 20A. A fluidic cylinder 56A is mounted on top of housing 54A. A forked key 60A is coupled to shaft 58A. Sheaves 62A and 64A are rotatably mounted on top of shaft 66A. Sheave 62A is ordinarily free to rotate independent of the rotation of shaft 66A, but sheave 64A is keyed to shaft 66A. Chain 50A passes around sheave 64A and chain 68A passes around sheave 62A. Shaft 66A is supported at its intersection with housing 54A by bearing 70A and at its intersection with parallel beam 20A by bearing 72A. When fluidic cylinder 56A is retracted, forked key 60A is in its uppermost position and sheaves 62A and 64A may rotate independent of one another. However, when fluidic cylinder 56A is extended, key 60A passes through holes 74 in sheaves in 62A and 64A, thereby locking together sheaves 62A and 64A.

Sprocket lock mechanism 52A is intended to lock together sheaves 62A and 64A so that, as explained more fully below, a steering movement of wheel assembly 16A results in a corresponding steering movement of wheel assembly 16B.

The structure of wheel assembly 16B is substantially identical to wheel assembly 16A with a few notable exceptions. As noted above in FIG. 3, chain 68A is wrapped around sheave 62A. Chain 68A extends from sheave 62A to sheave 76B on wheel assembly 16B. A tension idler 78 is mounted a top parallel beam 20A approximately mid-point between sprocket mechanism 52A and wheel assembly 16B. Tension idler 78 comprises a rotatable sheave 80 mounted on shaft 82. Rotatable sheave 80 is configured to slidably engage chain 68A to adjust the slack therein.

Referring again to FIGS. 1 and 3, a notched collar 84B is keyed to shaft 26B and positioned between sheave 76B and parallel beam 20A. Notched collar 84B has a notch 86B formed at its periphery. Notched collar 84B is positioned on shaft 26B such that when wheel assembly 16B is parallel to centerline 14A, notch 86B is positioned facing towards wheel assembly 16A and proximate the mid-line of parallel beam 20A. A fluidic cylinder 88B is mounted on top of parallel beam 20B proximate shaft 26B. A lug 90B is coupled to fluidic cylinder 88B. Lug 90B is configured to engage notch 86B on notched collar 84B when fluidic cylinder 88B is extended, thereby, locking wheel assembly 16B in a position parallel to centerline 14A.

Tube bundle extractor 10 operates in two distinct steering modes, a transport mode, and an extraction mode. The transport mode is used when tube bundle extractor 10 will travel over some distance, such as when transporting tube bundle 15A from tube shell 15B to a maintenance area. During transport mode, fluidic cylinder 88B and a corresponding fluidic cylinder on parallel beam 20B (not shown) are actuated to lock wheel assemblies 16B and 16D as discussed above. The extraction mode is utilized when the tube bundle extractor 10 is maneuvering into position proximate tube shell 15B where the full range of steering capability may be required to avoid obstacles. In this mode, wheel assemblies 16B and 16D are unlocked.

Regardless of whether tube bundle extractor 10 is operating in traveling mode or extraction mode, wheel assemblies 16A and 16C are intended to operate in unison, thus, when wheel assembly 16A is pivoted counterclockwise as viewed in FIG. 1, wheel assembly 16C will be pivoted counterclockwise as well. Ordinarily, this unison of pivoting movement would be accomplished by simultaneously actuating steering drives 32A and 32C. However, there may be slight variations in the steering inputs between steering drives 32A and 32C due to a slight difference in hydraulic pressure between the two steering drives 32A and 32C. In order to better ensure accurate unison in pivoting movements between wheel assemblies 16A and 16C, the two wheel assemblies 16A and 16C are mechanically linked.

Figure 6:
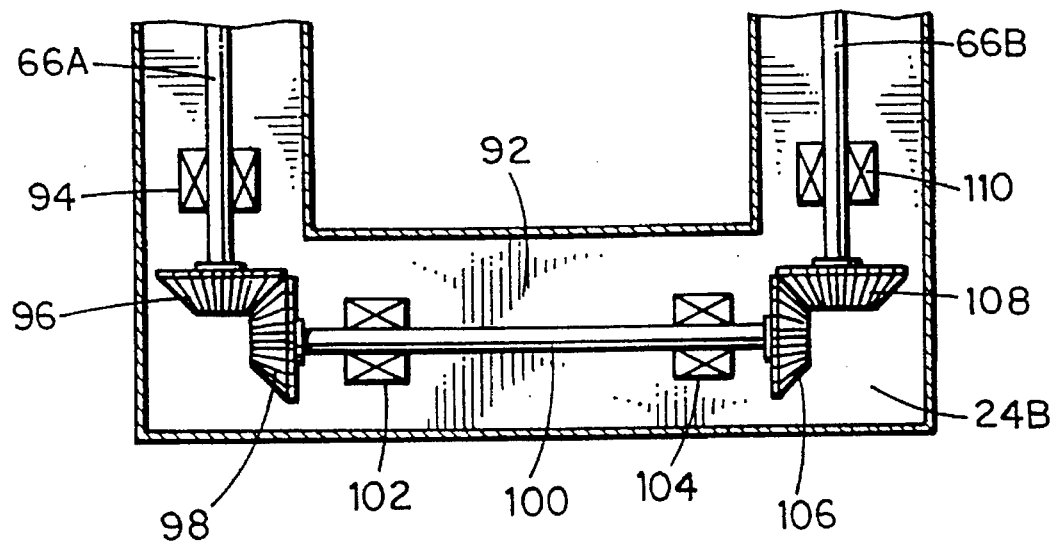
FIG. 6 depicts an exemplary linkage assembly of tube bundle extractor, illustrated in a front schematic view.

The structure and operation of the mechanical linkage between wheel assemblies 16A and 16C can be better understood by reference to FIGS. 1, 3, and FIG. 6, which is a detailed front schematic view of the linkage assembly 92. The lower end of shaft 66A is journaled through bearing 94 and terminates in right angle gear 96. Right angle gear 96 meshes with right angle gear 98 which is mounted on one end of shaft 100. Shaft 100 is journaled in bearings 102 and 104 which are rigidly coupled to transverse member 24B on mainframe 12. Right hand gear 106 is mounted on the end of shaft 100 opposite right hand gear 98 and meshes with right hand gear 108 which is mounted on the lower end of shaft 66B. Shaft 66B is journaled through bearing 110 which is mounted on transverse member 24B. Linkage mechanism 92 is designed so that a rotational input from shaft 66A will, in turn, rotate shaft 100, which will, in turn, rotate shaft 66B through approximately the same angle as shaft 66A.

The following discussion of wheel assembly 16A should be understood to be generally applicable to the structure and operation of wheel assemblies 16B–D since they are structurally identical to wheel assembly 16A.

Referring now to FIG. 7, which is a sectional view of wheel assembly 16A taken at Section A—A from FIG. 1, shaft 26A is coupled to caster 112 which provides a mount for both hydraulic motor 114 and dummy shaft 116. Hydraulic motor 114 has a stationary hub 114A that is preferably bolt or rivet connected to caster 112 by bolts 115 and a rotating hub 114B that is coupled to a rim 117. Dummy shaft 116 extends from a flange 118, which is bolt connected to rim 117, hydraulic motor 114, terminating in radial bearing 120. Rim 117 is preferably bolt connected to rotating hub 114B by bolts 124. Rim 117 has connected about its periphery a tire 128. Tire 128 is preferably is a solid cylindrical shell composed of polyurethane and capable of withstanding a 21,000 lb. It is anticipated that rubber tires will not have sufficient strength to withstand the loads associated with bundles weighing forty tons or more. Hydraulic motor 114 is preferably a series 12×35 cu.in./revolution displacement, manufactured by Reidville Hydraulics. It is preferred that shaft 116 terminate rotatably in bearing 120 since it is anticipated that shaft 116 should be supported at both ends in order to withstand the heavy loads anticipated.

The extraction frame 13 is raised and lowered by lifting columns 22A–D. The following description of lifting columns 22A–D focuses on lifting column 22A, but it should be understood that the discussion is applicable to lifting columns 22B–D since they are substantially identical in structure and operation to lifting column 22A.

Figure 9:
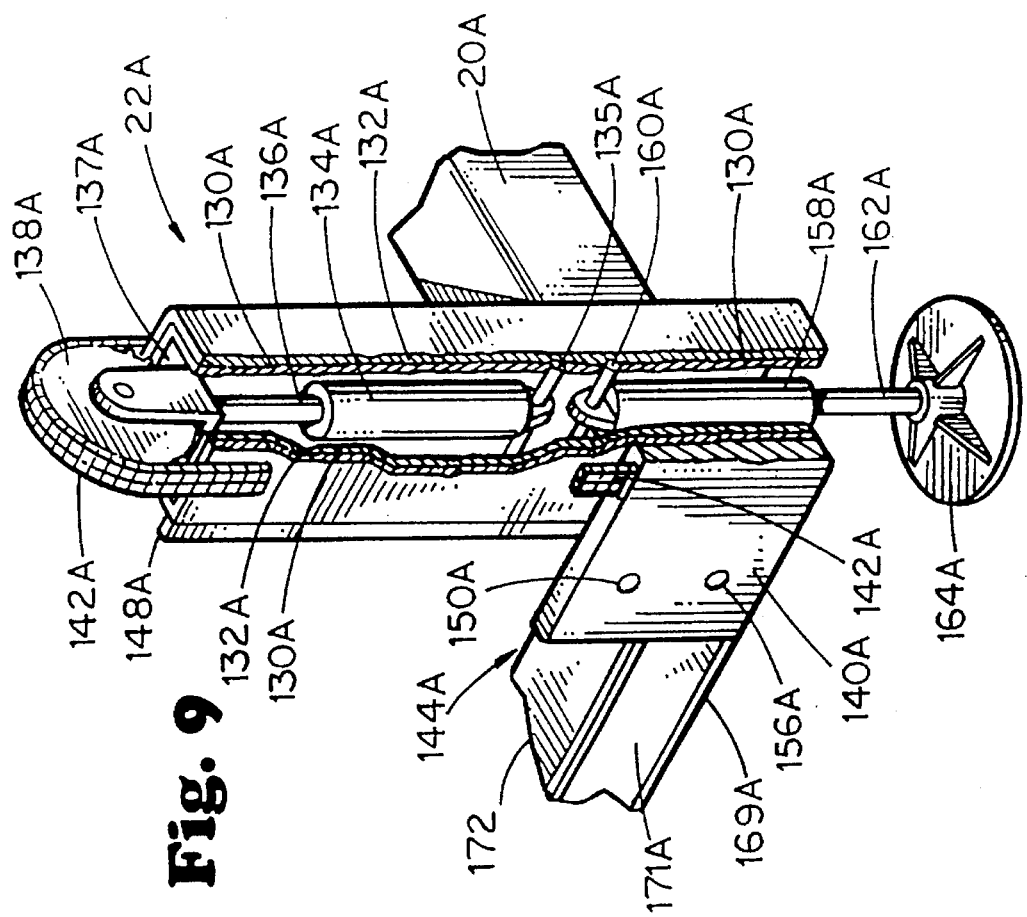
FIG. 9 depicts an exemplary lifting column, illustrated in a partially cut-away pictorial view.
Figure 8:
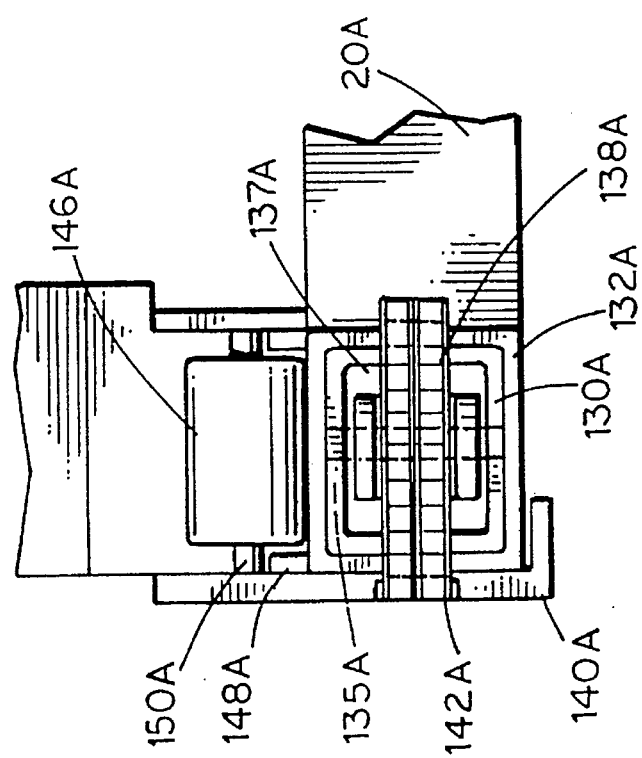
FIG. 8 depicts an exemplary lifting column, illustrated in a top view.

FIG. 8 shows a top view and FIG. 9 shows a partially cutaway perspective view of lifting column 22A. Lifting column 22A includes inner post 130A which is preferably a hollow beam of rectangular cross-section. Inner post 130A is attached to parallel beam 20A and transverse member 24A, shown in FIG. 1. An outer post 132A of the same cross-section type as inner post 130A is concentrically disposed outside inner post 130A. A solid lubricant such as Garlock stripping (not shown) is preferably disposed between outer post 132A and inner post 130A to facilitate sliding movement therebetween. A lifting cylinder 134A is vertically disposed within inner post 130A and outer post 132A and held in position by pin 135A which extends from parallel walls of inner post 130A. Pin 135A is preferably composed of 4140 alloy steel, hardened to approximately 56 HRC, and chrome plated. Lifting cylinder 134A is disposed such that its rod 136A translates upward from parallel beam 20A when extended. The top of rod 136A is attached to the top 137A of outer post 132A. A sheave 138A is attached to the exterior of the top 137A of outer post 132A. Angled member 140A is slidably mounted on the exterior of outer post 132A. Angled member 140A is not physically attached to outer post 132A, but rather is mechanically coupled to parallel beam 20A by way of chain 142A. Chain 142A is anchored to angled member 140A and extends upward engaging sheave 138A, and extending from sheave 138A down to, and anchoring on, parallel beam 20A. Chain 142A is preferably a 6×6 section leaf chain. A leaf type chain is preferred since such chains do not have impingement points which might bind during movement on sheave 138A.

Angled member 140A is rigidly attached to cross-member 144A by known techniques such as welding or riveting. The attachment method should be of sufficient strength to withstand the anticipated high shear stresses imparted at the junction between angled member 140A and cross-member 144A under load. As can be seen by reference to FIG. 1, cross-member 144A is part of extraction frame 13, and has a counterpart cross-member 144B.

The following description of cross-member 144A is also applicable to cross-member 144B. FIG. 1 shows a portion of cross-member 144A cutaway to reveal that cross-member 144A is composed of parallel channel members 169A and 169B which straddle transverse beam 24A. The corresponding channel members on cross-member 144B are not shown. The flange 171B of channel member 169B, shown in FIG. 10, faces away from the flange 171A of channel member 169A, shown in FIG. 9. Channel members are coupled together by top plate 172.

Figure 10:
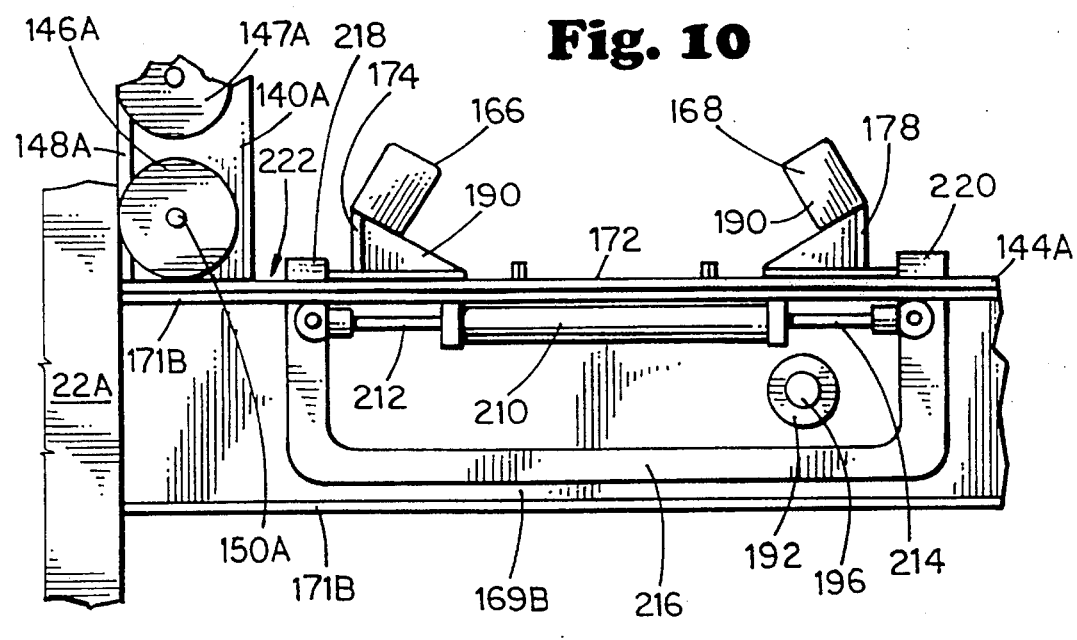
FIG. 10 depicts an exemplary cross-member, illustrated in a front view.

Referring now to FIGS. 8, 9, and to FIG. 10, which is front view of cross-member 144A, rollers 146A and 147A are rotatably mounted within channel 148A on outer post 132A by means of pins 150A and 152A which are coupled to angled member 140A. Rollers 146A and 147A are positioned to bear against the outer post 132A within channel 148A. Rollers 146A and 147A are intended to provide rolling surfaces to reduce the friction between outer post 132A and cross-member 144A when cross-member 144A is translated upward and downward by the extension and retraction of lifting cylinder 134A.

Referring now to FIG. 9, an outrigger cylinder 158A is vertically disposed within inner post 130A and is held in place therein by pin 160A. Pin 160A is preferably composed of 4140 alloy steel, hardened to approximately 56 HRC, and chrome plated. Outrigger cylinder 158A is disposed such that, when extended, its cylinder rod 162A translates away from lifting cylinder 134A. An outrigger pad 164A is coupled to cylinder rod 162A. As discussed more below, outrigger cylinder 158A is intended to extend cylinder rod 162A downward to bear outrigger pad 164A against the ground to stabilize tube bundle extractor 10 when the desired position of main frame 12 is achieved.

Referring now to FIGS. 1, 2, and 10, extraction frame 13 comprises cross-members 144A and 144B, a pair of substantially parallel rails 166 and 168 that are slidably mounted on top of cross-members 144A and 144B, a pulling car 170 that is slidably mounted on top of rails 166 and 168, and, as discussed more fully below, mechanisms to translate rails 166 and 168 and pulling car 170 along a path generally parallel to centerline 14A, and a mechanism to translate rails 166 and 168 along a path generally perpendicular to rails 166 and 168 and centerline 15A.

Figure 11:
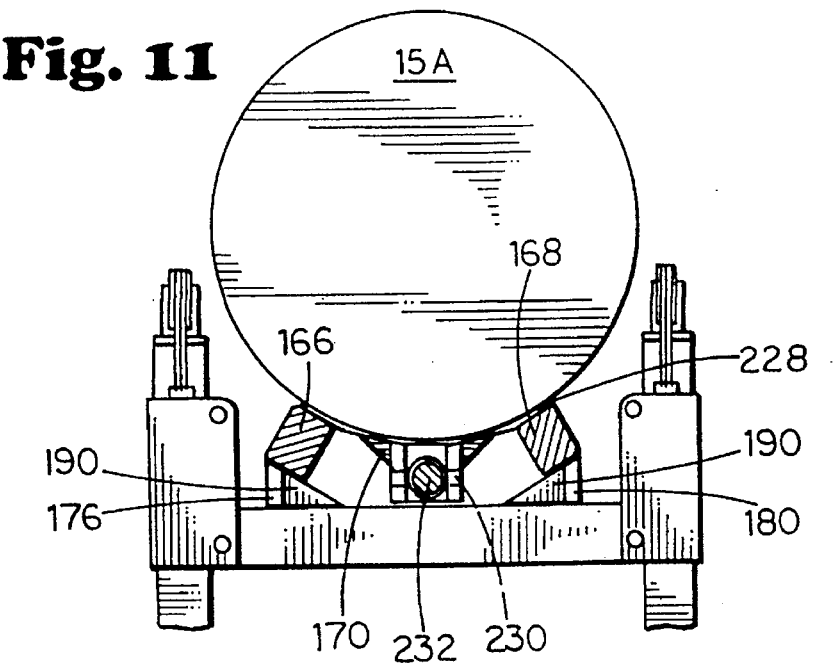
FIG. 11 is a sectional view of FIG. 1 taken at section B—B, showing an elevated position with a tube bundle loaded.

Referring now to FIGS. 1, 3, and 10, and to FIG. 11, which is a sectional view of FIG. 1 taken at section B—B and showing the extraction frame 13 elevated with tube bundle 15A loaded, rails 166 and 168 are coupled at one end by beam 173. Rail 166 is rigidly attached to the tops of T-sections 174 and 176, which are in turn, slidably mounted on top of cross-member's 144A and 144B. Similarly, rail 168 is rigidly attached to the tops of T-sections 178, 180 which are, in turn, are respectively slidably mounted on top of cross-members 144A and 144B.

T-sections 174 and 178 are coupled together by cross-members 182, 184. Similarly, T-sections 176 and 180 are coupled together by cross-members 186 and 188. A plurality of gussets 190 are coupled to T-sections 174, 176, 178, and 180, to increase the strength and stability of said T-sections 174, 176, 178, and 180.

Referring now to FIGS. 1 and 10, the mechanism for translating extraction frame 13 in a direction generally parallel to X-axis 18A shown on coordinate system 18, comprises a fluidic cylinder 192 mounted within the flanges 171B of channel member 169B as shown in FIG. 10. Fluidic cylinder 192 has a rod 196 that is extendable and retractable. A roller 198 is coupled to the end of rod 196 that extends from fluidic cylinder 192. The roller 198 is intended to bear against lug 200 which is rigidly attached to cross-member 184. Similarly, a fluidic cylinder 202 is coupled within the flanges (not shown) of one of the channel members (not shown) of cross-member 144B and has a rod 204 extendable therefrom that translates toward fluidic cylinder 192 when extended and has a roller 206 mounted at its end that is intended to engage lug 208 that is rigidly coupled to cross-member 186. Fluidic cylinders 192, 202 operate such that when it is desired to translate rails parallel to X-axis has rods 196, 204 are selectively extended and/or retracted to rollably bear against lugs 200, 208. It is preferred that rods 196, 204 rollably engage lugs 200, 208 so that rails 166 and 168 may be translated parallel to the X-axis without restricting the ability of extraction frame 13 to translate parallel to Y-axis 18B.

Referring now to FIGS. 1 and 10, the mechanism for translating extraction frame 13 in a direction generally parallel to Y-axis 18B, comprises a double action fluidic cylinder 210 mounted within the flanges 171B of channel member 169B. Double action cylinder 210 has a pair of opposing cylinder rods 212, 214 extending therefrom which are respectively coupled to arm 216. Arm 216 terminates at each end in lugs 218, 220 which are slidably disposed in slots 222 and 224 in the top of cross-member 144A. Double action cylinder 210 is configured such that when rod 212 is extended therefrom, rod 214 is retracted and vice-a-versa. The cooperative movement of rods 212, 214 translate lugs 218, 220 back and forth within slots 222, 224, thereby translating rails 166 and 168 back and forth along the Y-axis. The amount of Y-axis 18B travel available to rails 166 and 168 will depend upon the distance between rails 166 and 168, the distance between lifting columns 22A and 22B and 22C and 22D, and the length of slots 222, 224. It should be understood that a mechanism identical in structure and operation to double action cylinder 210, rods 212, 214 and lugs 218, 220 is disposed within the channel (not shown) of one of the channel members (not shown) of cross-member 144B.

Figure 14:
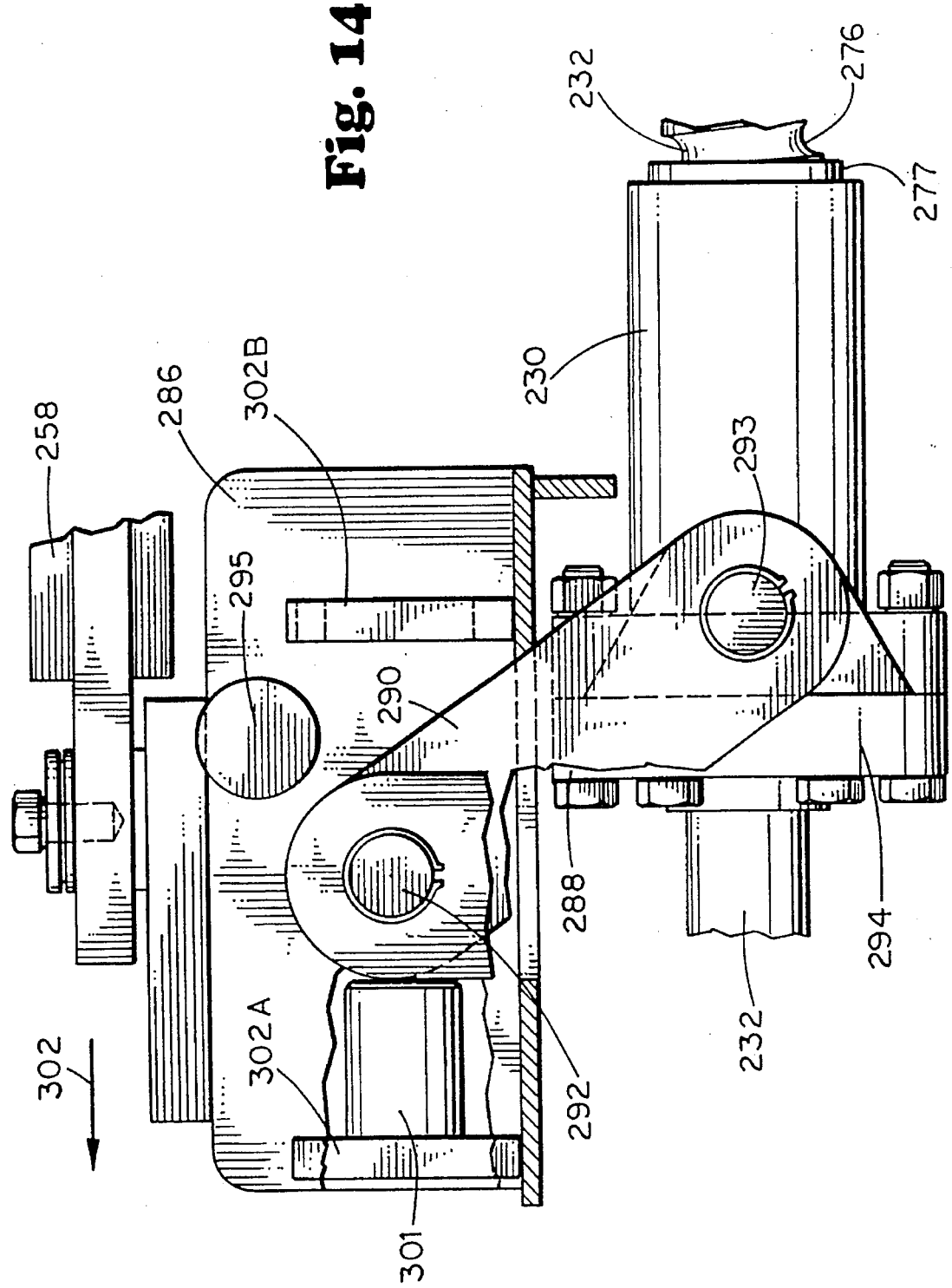
FIG. 14 depicts an exemplary pulling car, illustrated in a partial side view.

Referring now to FIG. 1 and FIG. 14, which is a partial side view of pulling car 170, pulling car 170 is utilized to extract tube bundle 15A from tube shell 15B and to push tube bundle 15A back into tube shell 15B. As explained more fully below, the initial translation of tube bundle 15A out of tube shell 15B is accomplished by connecting pulling car 170 to tube bundle 15A via cable slings 221A and 221B. Pulling car 170 is slidably disposed on rails 166 and 168. Pulling car 170 comprises a saddle 228, which rollably rests on rails 166 and 168, and which is preferably gull-winged in shape to conform to the angular disposition of rails 166 and 168.

Pulling car 170 has a ball nut 230 coupled to its underside and disposed between rails 166 and 168. Ball nut 230 is designed to engage a drive shaft 232 to be discussed more fully below.

Figure 12:
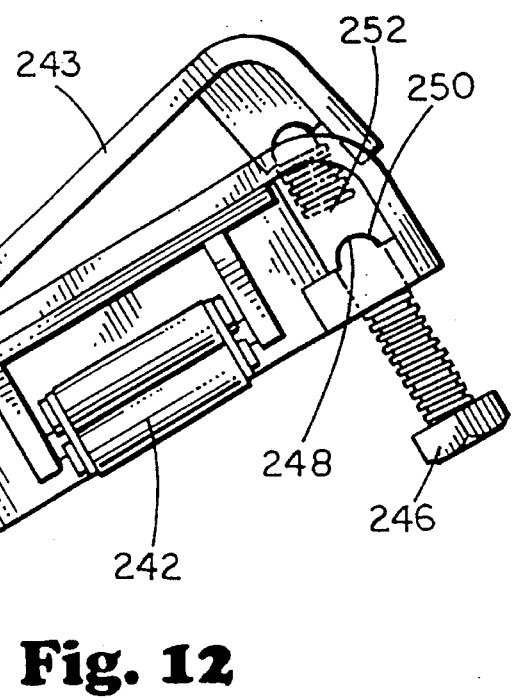
FIG. 12 depicts an exemplary skid, illustrated in a front partial view.

Skids 238, 239, and 240 have the same general cross-section as saddle 228 and are removably mounted on rails 166 and 168. Skid 238 provides the first supporting surface for tube bundle 15A when it is drawn from shell 15B and loaded onto extraction frame 13. Referring now to FIG. 12, which is a front partial view of skid 238 and is exemplary of skids 239 and 240, with the exception that a pipe guide 241 is mounted on skid 238. Skids 238, 239, and 240 have rollers 242 mounted thereon to provide for rolling contact between skids 239 and 240 and rails 166 and 168.

The cross-sections of skids 238, 239, and 240 are variable to accommodate tube bundles of various diameters. The following discussion is applicable to skids 238, 239, and 240. The mechanism for varying the cross-section of skid 238 comprises two arms that are pivotally coupled to skid 238. For simplicity of discussion, only one arm 243 is shown and discussed. Arm 243 is pivotally coupled to skid 238 by pin 244. An adjustment bolt 246 is threadably mounted on the peripheral edge of skid 238. Adjustment bolt 246 has at one end an external radius 248, which is configured to engage an internal radius 250 formed in block 252, which is, in turn, coupled to Arm 243. The initial angular position of arm 243 is represented by angle θ. The angular position arm 243 when fully pivoted is represented by θ'. By turning adjustment bolt 246 clockwise or counterclockwise arm 243 may be pivoted, to vary the angular position of arm 242 from its initial position represented by angle θ to any angle between θ and θ' by adjusting adjustment bolt 246 to decrease angle θ, tube bundles of smaller diameter may be more effectively handled.

Figure 13:
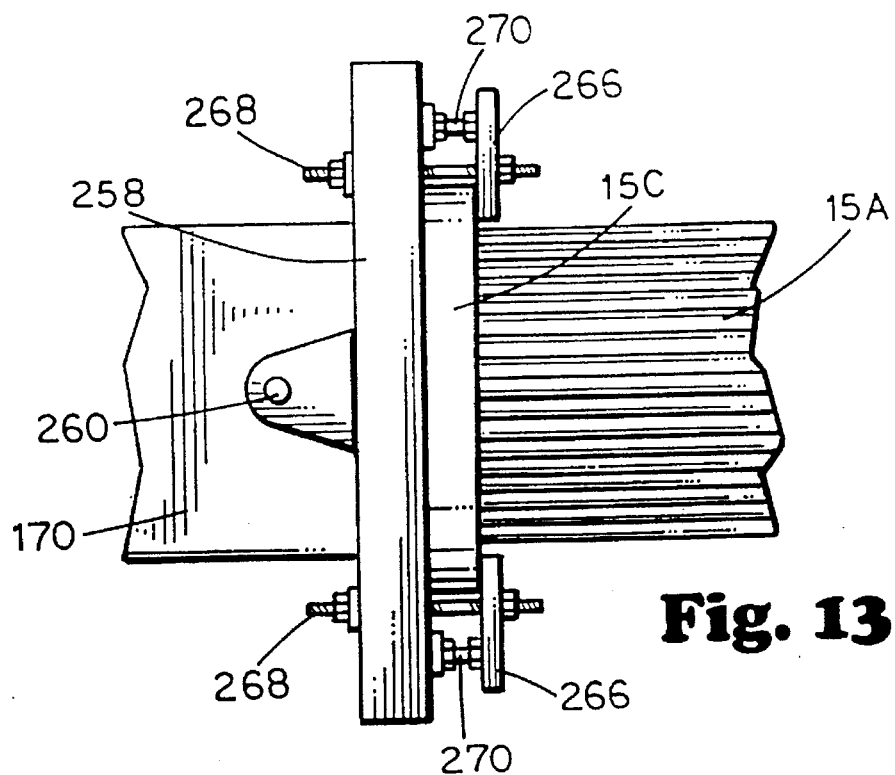
FIG. 13 depicts an exemplary pulling bar clamped to a tube bundle, illustrated in a top view.

A pulling bar 258 is mounted on the top of pulling car 170 and held in place by pin 260 as shown in FIG. 13, which is a top view of pulling bar 258 clamped to tube bundle 15A. Pulling bar 258 is free to rotate about pin 260. Pulling car 170 is proximate configured to clamp to the flange 15C of tube bundle 15A. When pulling bar 258 is approximately flush with flange 15C, plates 266 are bolted to pulling bar 258 by bolts 268. Bolts 268 are tightened so that plates 266 firmly engage the backside of flange of 15C. Spacers 270 are placed between plates 266 and pulling bar 258 to oppose the moments induced in plates 266 when pulling bar is moved to remove tube bundle 15A.

Figure 15A:
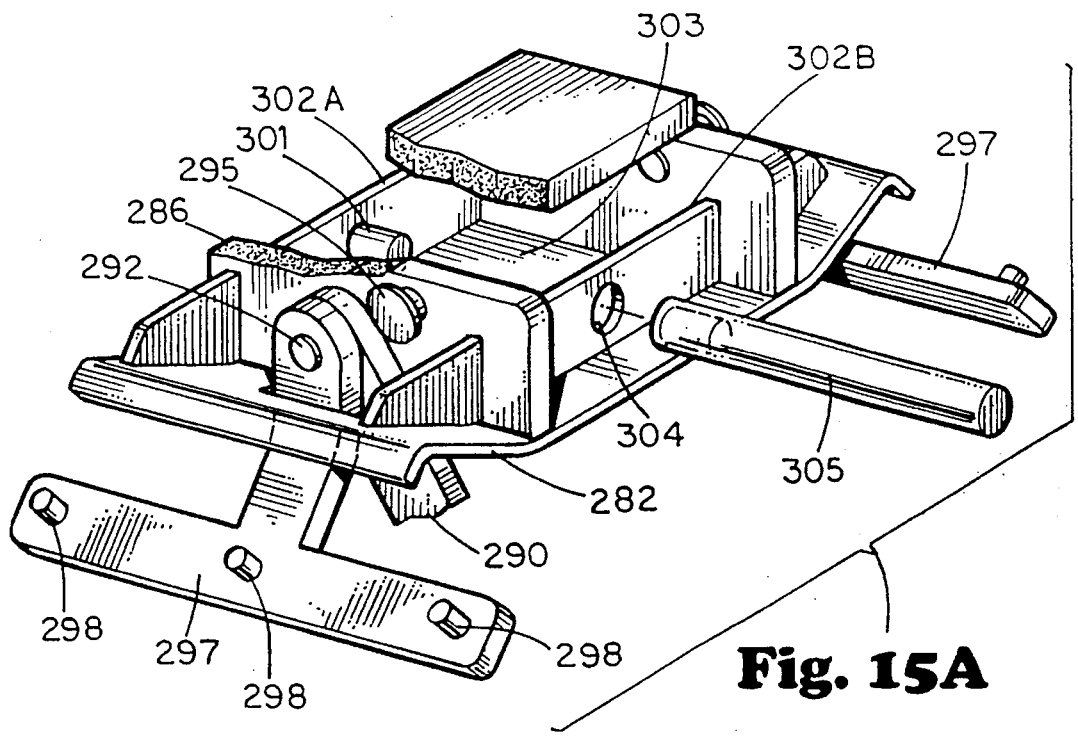
FIG. 15A depicts an exemplary pulling car, illustrated in a partial pictorial view.
Figure 15:
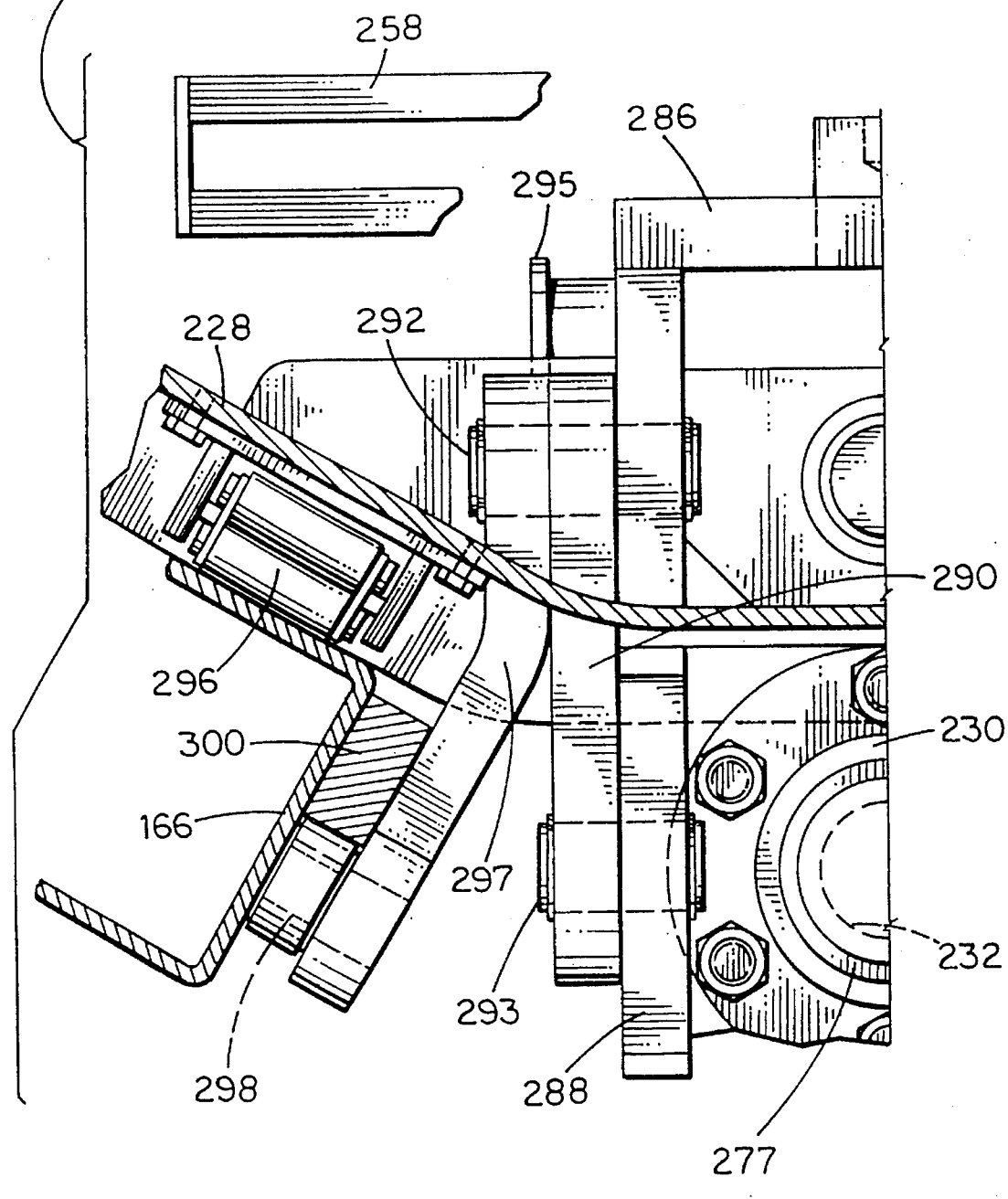
FIG. 15 depicts an exemplary pulling car, illustrated in a partial end or front view.

FIGS. 1, 11, 14, 15, and 15A show the structure to move pulling car 170 along rails 166 and 168. FIGS. 15 and 15A are respectively a partial front sectional view, and a partial pictorial view of pulling car 170. The power to move pulling car 170 along rails 166 and 168 is supplied by drive shaft 232. Drive shaft 232 is rotatably mounted at one end to a thrust bearing 272 and at the other to a radial bearing 274 which is mounted on top of cross-member 275. The middle portion of drive shaft 232 has machined grooves 276. As the drive shaft 232 rotates the grooves 276 mechanically engage ball nut 230. Drive shaft 232 is preferably a Model 4000-1000 SRT ball screw by Nook Industries, though other grooved shafts may be appropriate, provided the grooves are sufficiently strong and wear resistant such as those hardened to approximately 56 HRC and coated with manganese oxide. A cylindrical felt wiper 277 is disposed in ball nut 230 to remove debris from drive shaft 232.

In order to rotate drive shaft 232, torque is supplied to drive shaft 232 by chain drive 278, which is, in turn, coupled to hydraulic motor 279. Thrust bearing 272, chain drive 278, and hydraulic motor 278 are all mounted on top of cross-member 280 which extends from rail 166 to rail 168. When drive shaft 232 is rotated, it engages the interior of ball nut 230, thereby translating pulling car 170 back and forth parallel to drive shaft 232.

In an alternate preferred embodiment, drive shaft 232 may be held stationary and the rotational input provided by a mechanism applying rotating power to ball screw nut. This alternate preferred embodiment obviates the need for chain drive 278.

In two other alternate preferred embodiments, drive shaft 232 may be replaced with either a shaft (not shown) threaded with, for example, Acme threads, or with a worm gear (not shown) that meshes with a an enclosed pinion mounted on pulling car 170.

It is anticipated that when pulling car is coupled to tube bundle 15A, and drive shaft 232 is actuated to move pulling car 170 and thus tube bundle 15A away from tube shell 15B, the combined forces of the friction associated with moving the tube bundle 15A and the thrust applied by the drive shaft 232 will impart a force-couple system on pulling car 170. The force-couple system will have a tendency to rotate pulling car 170 clockwise as viewed from FIG. 3. As a result of the rotation, the leading edge 282 of pulling car 170, shown in FIG. 15A, may bind on surfaces 284 of rails 166 and 168, shown in FIG. 1, thereby inhibiting the movement of pulling car 170 and possibly damaging saddle 228 and surfaces 284. Structural elements have been added to pulling car 170 to reduce the effects of this force-couple system. For simplicity sake, only one-half of pulling car 170 will be discussed as the other half is structurally and operationally identical.

As can been seen by reference to FIGS. 14, 15, and 15A, which are respectively a partial side view, a partial end view, and a partial pictorial view of pulling car 170, pulling car 170 comprises an upper half 286 and a lower half 288, which are pivotally coupled together by pivoting arm 290, which is rotatably coupled to upper half 286 by pin 292 and rotatably coupled to lower half 288 by pin 293. Lower half 288 is composed of a flange 294 that is configured to bolt connect to ball nut 230. A davit 295 is mounted on upper half 286 to enable a cable 221B, as shown in FIG. 1, to be attached thereto. Rollers 296 are coupled to saddle 228 on upper half 286 to provide load bearing rolling contact between pulling car 170 and rails 166 and 168. An angled pivot arm 297 is also pivotally coupled to upper half 286 by pin 292. Angled pivot arm 297 has at its lower end, rollers 298 that are positioned to engage a stop strip 300 which is coupled to and extends along the length of rail 166. An identical stop strip is mounted identically on rail 168.

Referring now to FIGS. 12, 14, 15, and 15A, upper half 286 of pulling car 170 includes a cylindrical lug 301 that is longitudinally mounted on gusset 302A and facing toward the interior 303 of upper half 286. Gusset 302B has a hole 304 having a diameter slightly larger than the diameter of cylindrical lug 301 in order to accommodate a pipe ram 305 which may be inserted through pipe guide 241 on skid 238, and through hole 304 and slipped over cylindrical lug 301 and seated against gusset 302A. As explained more fully below, pipe ram 305 is used under certain circumstances to push tube bundle 15A into tube shell 15B.

With these additional structural elements, pulling car 170 behaves in the following way when coupled to tube bundle 15A and translated away from tube shell 15B as indicated by direction arrow 302 in FIG. 14. When drive shaft 232 is actuated, it will apply a force on lower half 288 of pulling car 170 in the direction of arrow 302. At the same time the friction associated with the weight of tube bundle 15A will exert a force on upper half 286 of pulling car 170 in a direction opposite to arrow 302. This force-couple system would ordinarily tend to bind rollers 296 into surfaces 284 on rails 166 and 168, thereby making it more difficult for drive shaft 232 to propel pulling car 170. With pulling car 170 fabricated as discussed above, when the force-couple system is applied to pulling car 170, upper half 286 will translate slightly in a direction away from arrow 302 while lower half 288 will translate slightly in the direction of arrow 302. Since upper and lower halves 286, 288 are pivotally coupled by pivoting arm 290, pivoting arm 290 will rotate slightly clockwise to enable upper and lower halves 286, 288 to slide relative to one another. Furthermore, angled pivot arm 296 rotates to maintain rollers 298 in contact with stop strip 300.

It is preferable that extraction frame 13 be securely clamped to tube shell 15B when tube bundle 15A is being moved or replaced. Two well-known mechanisms are incorporated into extraction frame 13 in order to accomplish this clamping feature. Referring now to FIG. 1, fluidic cylinders 304A and 304B are rigidly on mounted rails 166 and 168 respectively. The following discussion will focus on fluidic cylinder 304A however, the discussion will be equally applicable to fluidic cylinder 304B. A rod 306A extends from fluidic cylinder 304A and has attached at its free end a sheave 308A. A cable sling 310A is looped around sheave 308A. Cable sling 310A is designed to be looped over a bolt or some similar attachment device on tube shell flange 15C.

Once cable sling 310 is secured to tube shell flange 15C, fluidic cylinder 304A is actuated to retract rod 306A and place tension on cable sling 310A to provide a forced clamping extraction frame 13 to tube shell 15B.

An additional and more powerful clamping force is provided by hydraulic clamps 312A and 312B. The structure and operation of hydraulic clamps 312A and 312B is disclosed in U.S. Pat. No. 4,053,062.

Figure 16:
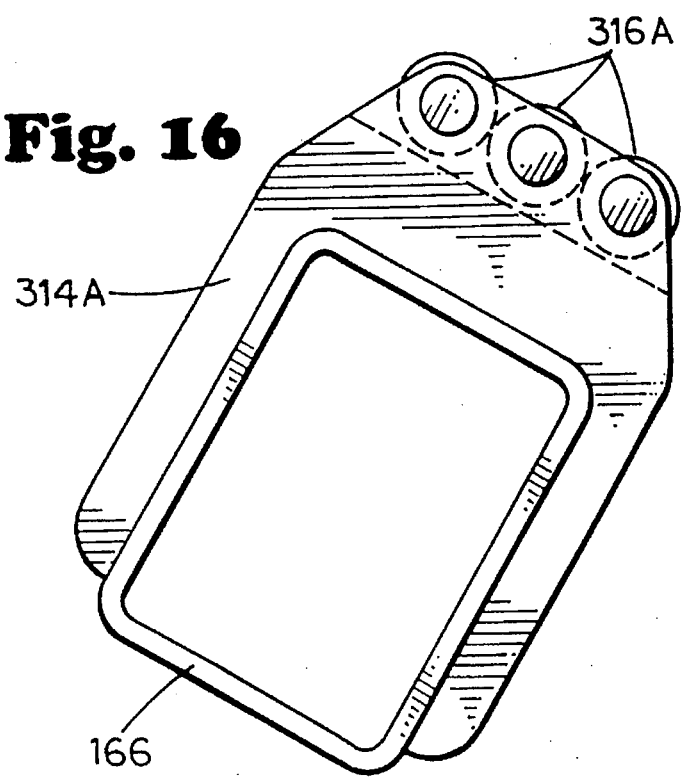
FIG. 16 depicts an exemplary extraction frame rail, and butt plate illustrated in an end view.

There will be circumstances where tube bundle 15A must be rotated either just prior to its removal from the tube shell 15B, or after it is inserted within tube shell 15B. If the tube bundle 15A must be rotated while a portion of it is still seated on extraction frame 13, it is desirable to provide a rolling surface between the tube bundle 15A and extraction frame 13. To accomplish this result, a pair of butt plates 314A and 314B are respectively mounted on rails 166 and 168 as shown in FIG. 1 and in FIG. 16, which is an end view of rail 166 and is illustrative of both butt plates 314A and 314B. Butt plate 314A preferably has three roller bearings 316A that, together with roller bearings 316B on butt plate 316B provide a rolling surface to facilitate the rotational movement of tube bundle 15A.

Figure 17:
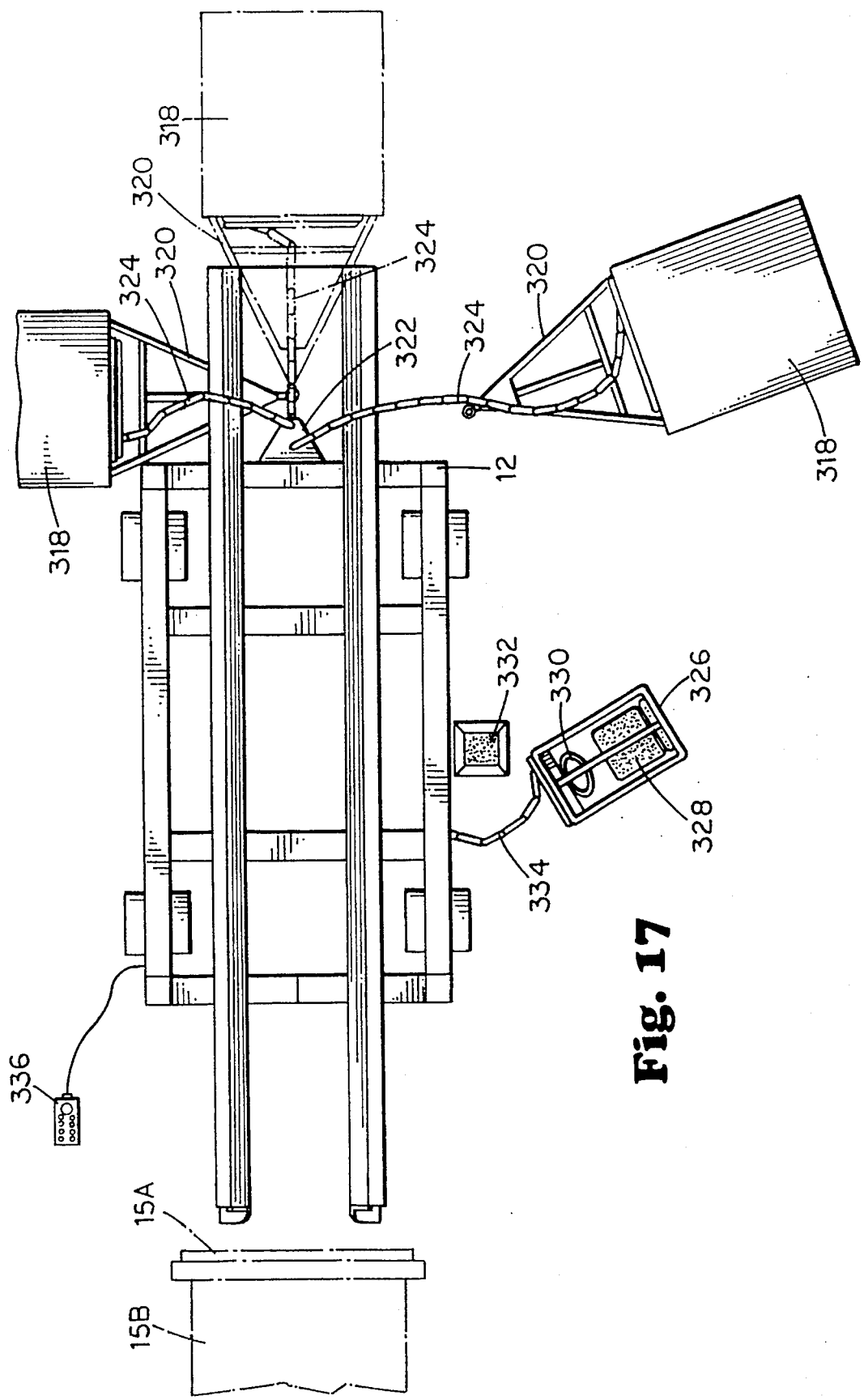
FIG. 17 depicts an exemplary tube bundle extractor, illustrated in a top schematic view.
Figure 19:
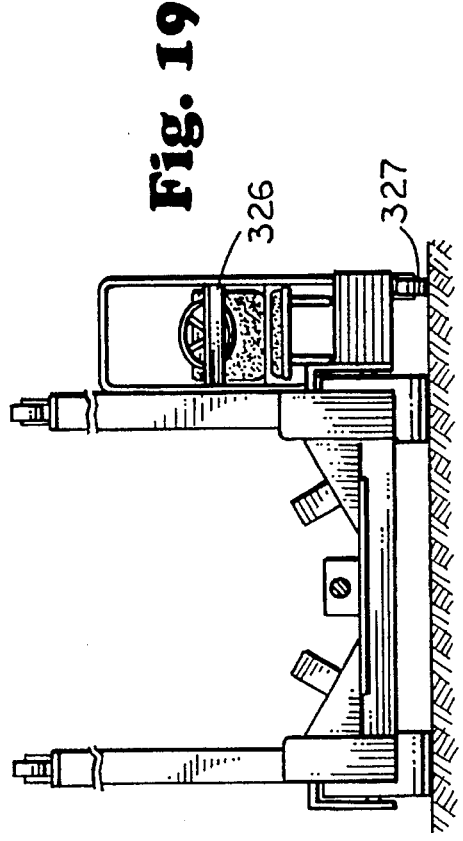
FIG. 19 depicts an exemplary tube bundle extractor, illustrated in an end schematic view.
Figure 18:
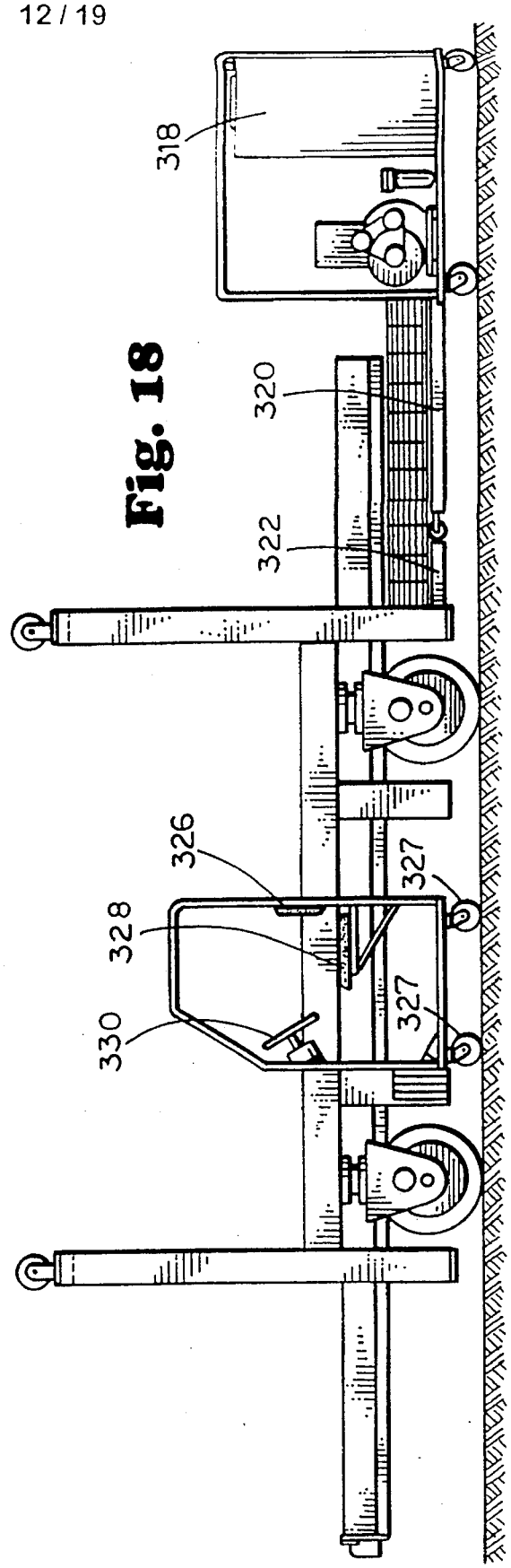
FIG. 18 depicts an exemplary tube bundle extractor, illustrated in a side schematic view.

Application of power and control to tube bundle extractor 10 may be understood by reference to FIGS. 17, 18, and 19, which are respectively top, side, and end schematic views of tube bundle extractor 10. Hydraulic power to actuate the various hydraulic cylinders and motors on tube bundle extractor 10 is provided by wheel mounted power unit 318. As shown in FIG. 17, power unit 318 has a tongue 320 which enables power unit to be either pivotally coupled to mainframe 12 at hitch 322, or to be detached from main frame 12 as necessary to clear an obstruction. In either case, power unit 318 is coupled to tube bundle extractor 10 by umbilical 324. Umbilical 324 contains hydraulic tubing to convey pressurized hydraulic fluid to the various systems on tube bundle extractor 10. Power unit 318 should preferably provide at least 67 gpm at 3000 psi.

Steering of tube bundle extractor 10 and the vertical movement of extraction frame 13 are controlled from cab 326. Cab 326 has a seat 328 and steering wheel 330 to accommodate an operator. Cab 326 is normally attached to tube bundle extractor 10 during travelling mode, but may be detached from tube bundle extractor 10 to clear an obstruction such as vertical column 332 showing in FIG. 17. Cab 326 preferably has three to four casters 327. Cab 326 is connected to the hydraulic system on tube bundle extractor 10 by umbilical 334.

The remaining control inputs are provided via a remotely attached control panel 336 which may be placed on tube bundle extractor 10 during travelling mode, but is ordinarily removed and hand held by an operator during the extraction mode. Control panel 336, is preferably configured to control the movements of lifting columns 22A–D, extraction frame 13, fluidic cylinders 304A and 304B, and hydraulic clamps 312A and 312B. There may be circumstances where it is desirable to incorporate all the control functions within a single location, such as cab 326.

In operation, tube bundle extractor 10 is driven to the location of the particular heat exchanger tube bundle 15A to be extracted, with cab 326 positioned as shown in FIG. 19, and power unit 318 in tow as shown in FIG. 18. Depending upon the particular obstructions in place around tube shell 15B, tube bundle extractor 10 may be positioned proximate tube shell 15B either in travelling mode or extraction mode. For example, if tube bundle extractor 10 must be moved generally along the Y-axis 18B shown in FIG. 1, wheel assemblies 16B, 16D will have to be decoupled by actuating cylinders 88A and 88B to remove notches 86A and 86B from notched collars 84A and 84B as shown in FIG. 1. For purposes of this illustration, refer to FIG. 1, which shows that tube bundle extractor 10 positioned with its center line 14A offset from the center line 14B of tube shell 15B due to the presence of obstruction 338. Once tube bundle extractor 10 has been positioned, outrigger pads 164A–D are lowered to the ground to stabilize tube bundle extractor 10. At this point, extraction frame 13 is raised by actuating the lifting cylinders 134A–D in lifting columns 22A–D. Once extraction frame 13 is raised to the elevation of tube shell 15B as shown in FIG. 20, which is a side view of extraction frame 13 shown in an elevated position, any adjustments for any obstructions can be made. For example, as a result of the presence of obstruction 332, extraction frame 13 is not aligned with the center line 14B tube shell 15B. In order to accomplish this alignment, cylinders 210A and 210B are actuated to move extraction frame 13 along Y-axis 18C, thereby lining up the center line 14B of tube bundle extractor 10 with the center line 14B of tube shell 15B. Adjustment of extraction frame 13 may also be necessary along the X-axis 18A, if, for example, tube bundle 15A is at the top of a stack of two or more heat exchangers. In such circumstances, the presence of the lower heat exchanger channels (not shown) require mainframe 12 to positioned some distance away from tube bundle 15A. In this situation, extraction frame 13 must be translated along X-axis 18A towards tube shell 15B once it is raised in order to be positioned proximate tube shell 15B. In order to accomplish the X-axis translation of extraction frame 13, in this situation, fluidic cylinder 192 is actuated to extend rod 196 to bear against lug 200, thereby translating extraction frame 13 towards tube shell 15B.

When rails 166 and 168 are positioned proximate tube shell 15B, cylinders 304A and 304B are actuated to extend rods 306A and 306B, providing slack in cable slings 310A and 310B. Cable slings 310A and 310B are then coupled to tube shell flange 15C. Hydraulic clamps 312A and 312B are then actuated to clamp tube shell flange 15C. Hydraulic cylinders 304A and 304B are then actuated to retract rods 306A and 306B to place tension on cable slings 310A and 310B. Using the mechanisms previously described, fine tuned movements of extraction frame 13 may be accomplished to quickly and accurately position extraction frame 13 with respect to tube shell 15B.

To extract tube bundle 15A from tube shell 15B, pulling car 170 is translated towards tube shell 15B by actuating drive shaft 232. Pulling car 170 is translated toward tube shell 15B until it is proximate skids 238, 239 and 240. The skids 238, 239, and 240 are positioned by hand during extraction. Due to the position of skids 238, 239 and 240, pulling bar 258 cannot initially be coupled to tube shell 15B. In order to pull tube bundle 15A out a sufficient distance from tube shell 15B, such that pulling bar 158 may be attached directly to tube shell 15A, cable slings 221A and 221B are coupled to pulling car 170 and have their ends 330A and 330B coupled to tube bundle 15A using any of a number of known methods. Pulling car 170 is then translated away from tube shell 15B by again actuating drive shaft 232. Pulling car 170 is then translated a sufficient distance away from tube shell 15B to enable pulling car 170 to translate back toward tube shell 15B and attach pulling bar 258 to tube bundle 15A. Pulling car 170 is then again translated away from tube shell 15B to pull tube bundle 15A onto extraction frame 13. Depending on the length of tube bundle 15A, as it is pulled out of tube shell 15B, it will at various points seat on top of skids 238, 239 and 240.

Once tube bundle 15A is pulled completely out of tube shell 15B, extraction frame 13 is translated along the Y-axis 18B by actuating cylinders 210A and 210B.

Extraction frame 13 is also translated back to its original position along X-axis 18A by actuating cylinder 202, to bear roller 206 against lug 208. Once tube bundle 15A is completely out of tube shell 15B, hydraulic clamps 312A and 312B and cable slings 310A and 310B are disconnected from tube shell 15B and extraction frame 13 is lowered to its lower most position by actuating lifting cylinders 134A–D in lifting columns 22A–D.

Outrigger pads 164A–D are then raised. Tube bundle extractor 10 is now ready to transport tube bundle 15A to a maintenance area, either in travelling mode or in extraction mode.

To replace a tube bundle 15A, the foregoing process is reversed. It should be noted that when inserting the tube bundle 15A, skids 238, 239 and 240, if in place, will prevent pulling car 170 from translating along rails 166 and 168 toward tube shell 15B a sufficient distance to enable pulling car 170 to insert tube bundle 15A completely into tube shell 15B. Pulling car 170 may translate tube bundle 15A until pulling car 170 is proximate skids 238, 239 and 240. At that point, tube bundle 15A may be disconnected from pulling bar 158, and pulling car 170 may be moved away a sufficient distance to allow installation of pipe ram 305 on pulling car 170 as shown in FIG. 15A. Pulling car 170 may then be moved toward tube bundle 15A until pipe ram 305 bears against, and urges tube bundle 15A completely into tube shell 15B.

Figure 21:
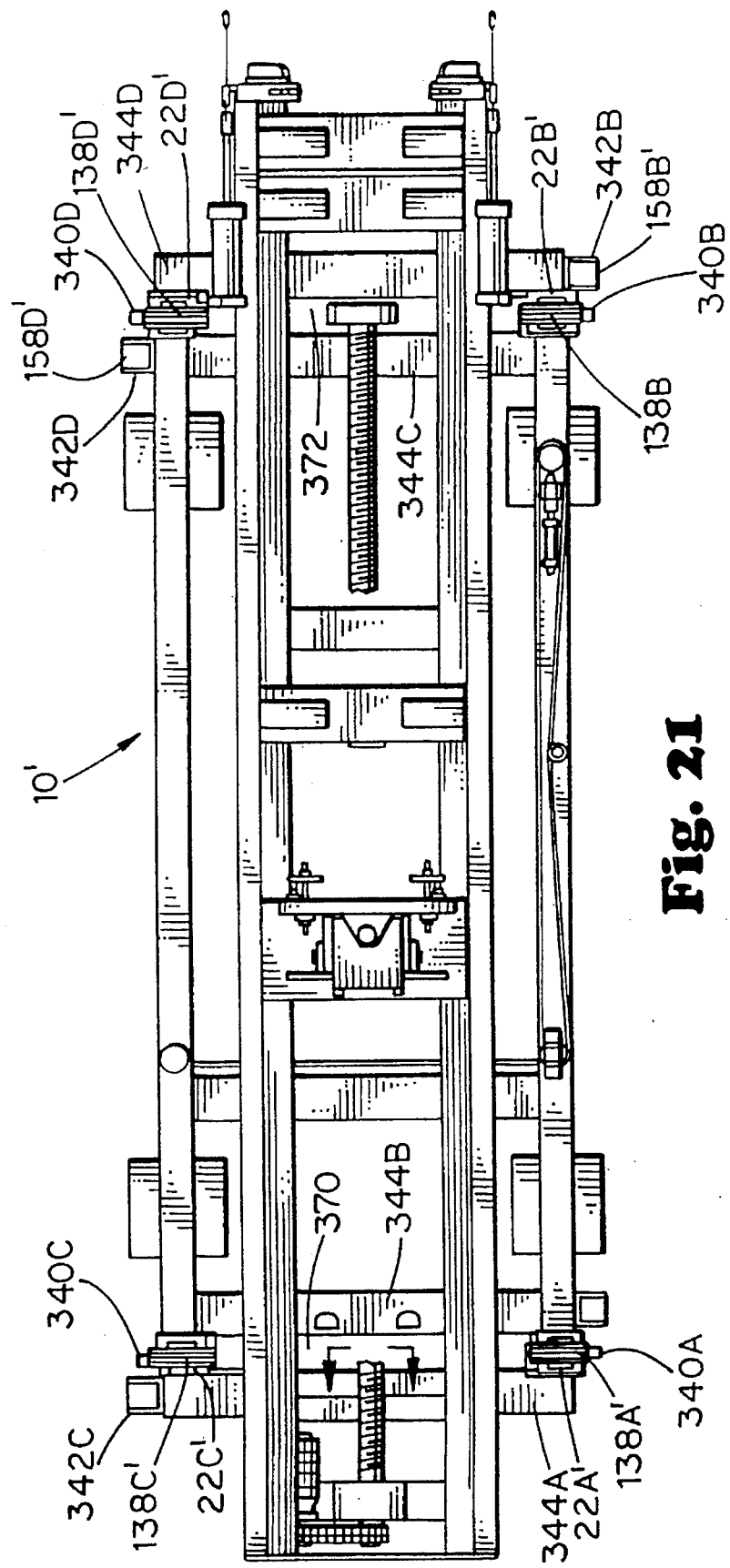
FIG. 21 depicts an exemplary alternate preferred embodiment of tube bundle extractor, illustrated in a top view.
Figures 22, 23:
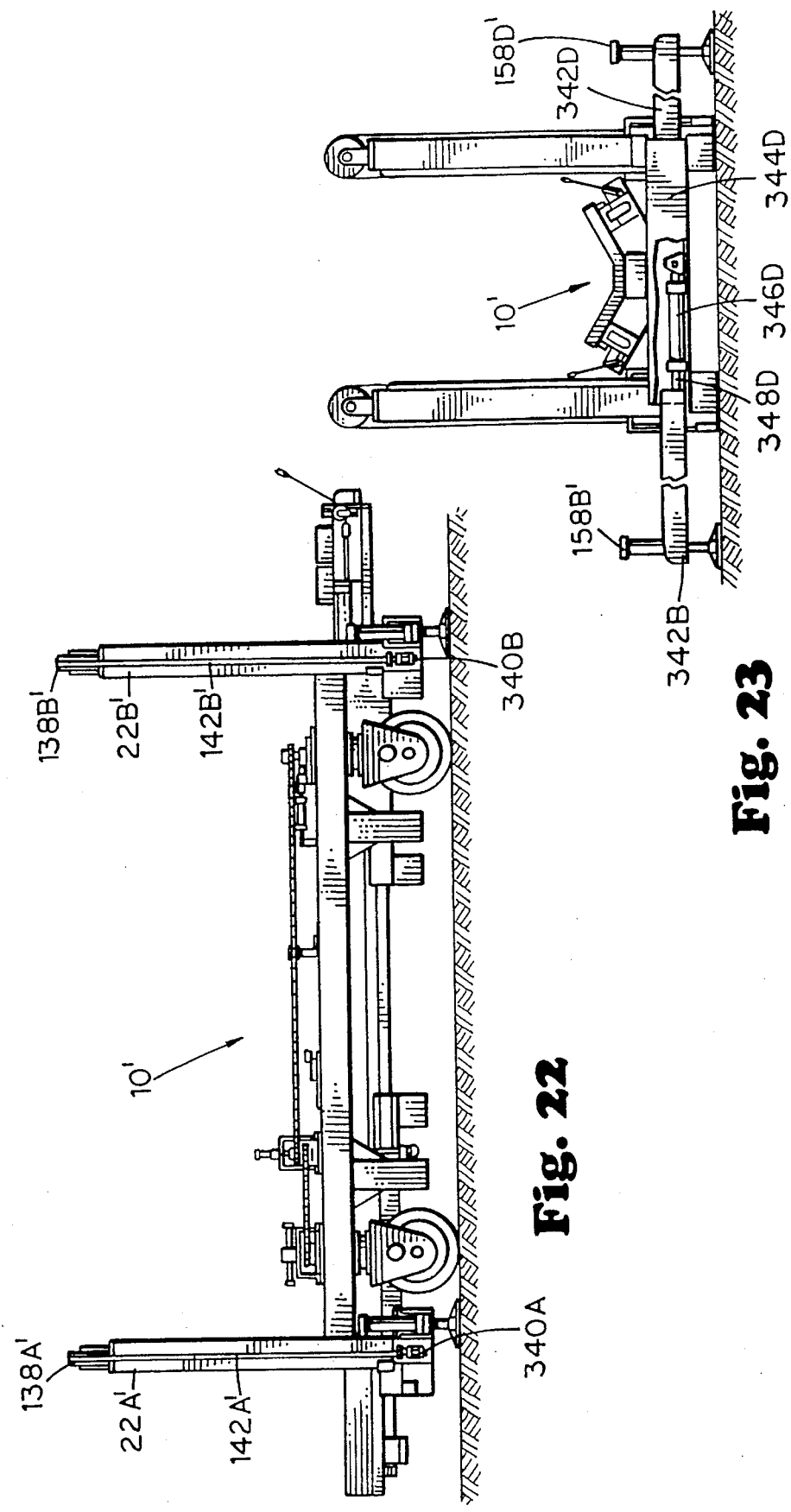
FIG. 22 depicts an exemplary alternate preferred embodiment of tube bundle extractor, illustrated in a side view.
FIG. 23 depicts an exemplary alternate preferred embodiment of tube bundle extractor, illustrated in an end view.

The maximum height to which extraction frame 13 may be elevated in the foregoing preferred embodiment is limited by the height of lifting columns 22A–D and rods 136A–D. An alternative preferred embodiment is designed to be capable of elevating extraction frame 13 to much greater heights in order to reach tube bundles that may be positioned higher than is reachable by the foregoing preferred embodiment. Referring now to FIG. 21, which is a top view of an alternate preferred embodiment of tube bundle extractor 10', FIG. 22, which is a side view of tube bundle extractor 10', and FIG. 23, which is an end view of tube bundle 10', tube bundle extractor 10' is structurally and operationally identical to tube bundle extractor 10 with a few notable differences. Sheaves 138A'–D' are rotated 90° from the positions of sheaves 138A–D. As a result, chains 142A'–D' are anchored to lifting columns 22A'–D' at anchors 340A and 340B. To facilitate the stability of tube bundle extractor 10' when extraction frame 13 is elevated to greater heights, outrigger cylinders 158A'–D' are respectively mounted on outrigger beams 342A–D, which are, in turn, respectively slidably disposed within cross-members 344A–D. The following discussion of outrigger beams 342A–D and cross-members 344A–D, focuses on outrigger beam 342B and cross-member 344D, but it should be understood that the discussion is applicable to outrigger beams 342A and 342C–D and cross-members 344A–C as well. Referring now to FIG. 23, which is an end view of tube bundle extractor 10', cross-member 344D is shown cut away to reveal that outrigger beam 342B is connected to fluidic cylinder 346D by rod 348D. Rod 348D is extendable and retractable to selectively extend or retract outrigger beam 342B from cross-member 344D. The length of fluidic cylinder 346D may be any of a number of lengths, depending on the amount of travel desired for outrigger beam 342B. To facilitate the sliding movement of outrigger beam 342B within cross-member 344D, Garlock strips are preferably disposed at the interface between cross-member 344D and outrigger beam 342D.

Figure 24:
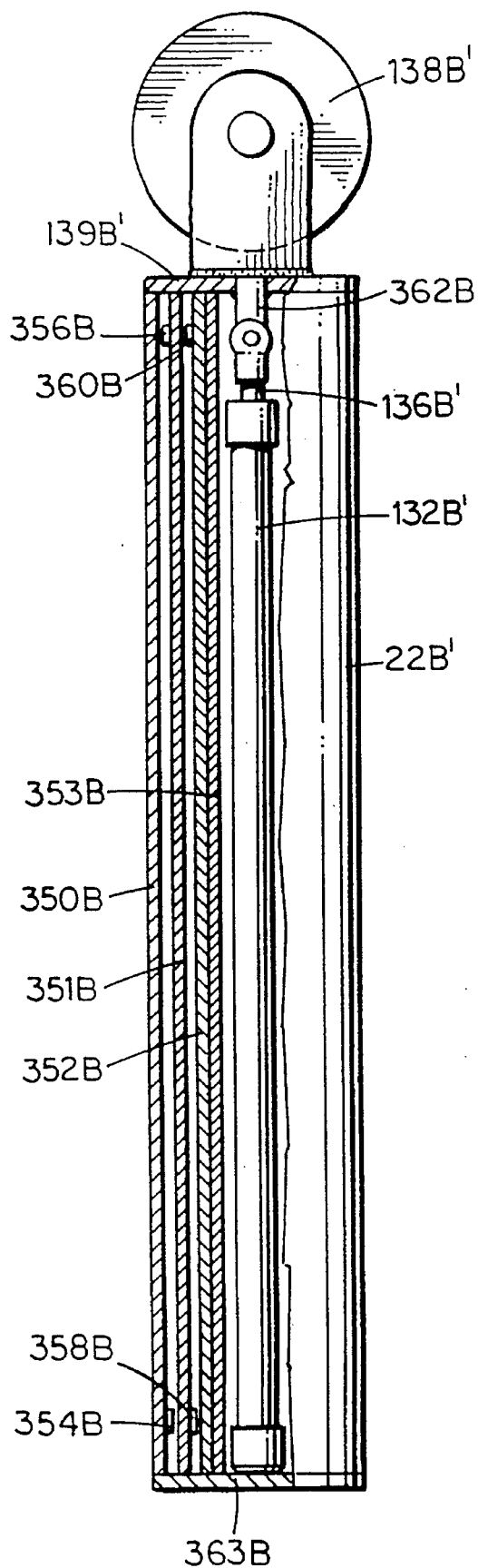
FIG. 24 depicts an exemplary alternate preferred embodiment of a lifting column, illustrated in a partial sectional view.

To achieve greater elevations, lifting columns 22A'–D' include a plurality of concentrically disposed inner posts that, as discussed more fully below, rise telescopically in response to the movement of a fluidic cylinder. Referring now to FIG. 24, which is a partial sectional view of lifting column 22B', and which is exemplary of lifting columns 22A' and 22C'–D', lifting cylinder 132B' is vertically disposed within an outer posts 350B, inner posts 351B, and 352B, and fixed post 353B, which are themselves concentrically disposed. To achieve a telescopic movement of outer post 350B, and inner posts 351B and 352B, stop 354B is placed on the inner side of the lower end of outer post 350B, stop 356B is placed on the outer surface of the upper end of inner post 351B, stop 358B is placed on the lower end of the inner surface of inner post 351B, and stop 360B is placed on the outer surface of the upper end of inner post 352B. A shaft 362B pivotally connects sheave 138B' to rod 136B'. Shaft 362B extends through top plate 139B', which is attached to outer post 350B, but not to inner posts 351B and 352B. As rod 136B' translates upward, shaft 362B engages top plate 139B', thereby translating upward outer post 350B. As outer post 350B translates upward, stop 354B engages stop 356B, thereby moving inner post 351B upward along with outer post 350B. As inner post 351B translates upward, stop 358B, engages stop 360B, thereby translating inner post 352B upward along with inner posts 350B and 351B in a telescoping fashion. Fixed post 353B is fixed to bottom plate 363B. Stops (not shown) may be placed between fixed post 353B and inner post 352B, but they may also be omitted as shown, since the stroke of cylinder 132B' is sized to prevent inner post 352B from sliding completely off fixed post 353B.

When the process is reversed, outer post 350B and inner posts 351B and 352B, telescope downward to their initial positions.

One final difference between the first and second preferred embodiments of tube bundle extractor 10, rests in the mechanism used to translate extraction frame 13 parallel to X-axis 18A on FIG. 1.

Figure 25:
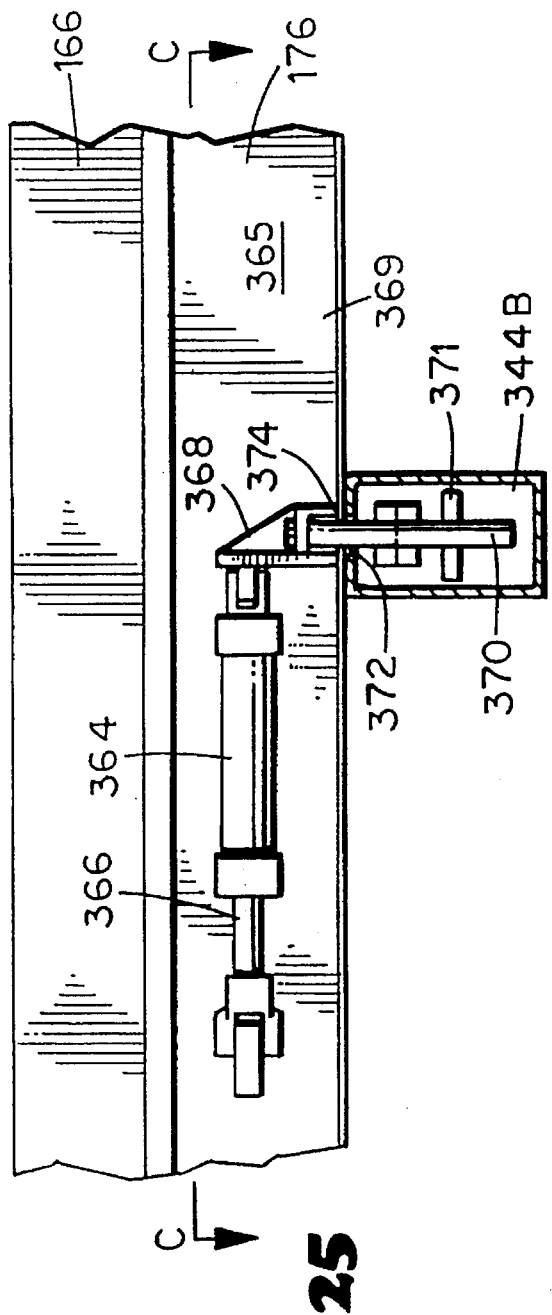
FIG. 25 depicts an exemplary alternate preferred embodiment of a mechanism to translate extraction frame forward and backward, illustrated in a partial side view.
Figure 26:
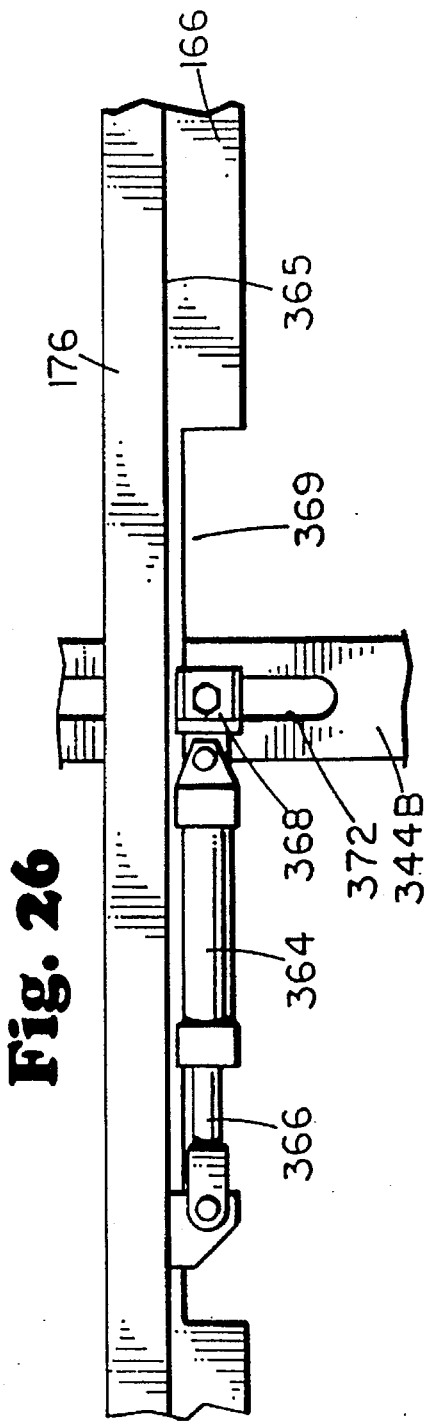
FIG. 26 depicts a sectional view of FIG. 25 taken at section C—C.

Referring now to FIGS. 25 and 26, which are respectively a partial side view of rail 166 and a top sectional view of rail 166 taken at section C—C of FIG. 25. A fluidic cylinder 364 is disposed on side 365 of T-section 176, with its rod 366 pivotally coupled to side 365. The other end of cylinder 364 is pivotally coupled to a joint 368 which protrudes through a longitudinal cutaway 369 that is formed in the underside of T-176. Cutaway 369 is positioned on T-176 at the point on T-176 that rests on cross-member 344B. Joint 368 is coupled to a lug 370 which is, in turn, coupled to an arm 371. Lug 370 extends from arm 371 through a slot 372 in cross-member 344B and into cutaway 369. Joint 368 is configured such that its lower end 374 is flush with the top of cross-member 344B. As fluidic cylinder 364 is selectively extended anal retracted, rail 166 is translated back and forth in the same direction as rod 366.

It should be understand that the foregoing discussion of an alternate embodiment of a mechanism to translate rails 166 and 168 along X-axis 18A is exemplary of an identical structure that is present on T-section 180, cross-member 344A, and on T-sections 174 and 178, as depicted in FIGS. 10 and 11, though on T-sections 174 and 178, the fluidic cylinder rods (not shown) will be extensible in a direction opposite to rod 366 shown in FIGS. 25 and 26.

Figure 27:
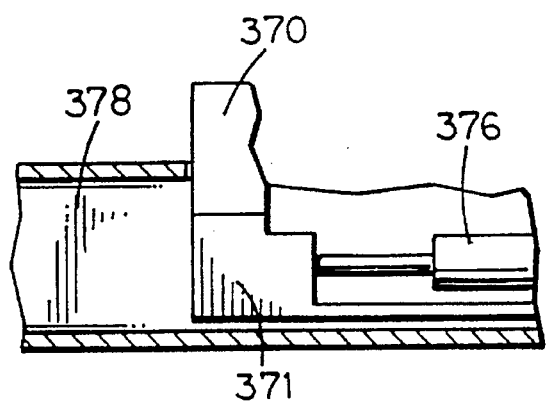
FIG. 27 depicts a partial sectional schematic view of FIG. 21 taken at section D—D.

Referring to FIGS. 21 and 27, a double acting cylinder 376 and arm 371 are used to move extraction frame 13 along the Y-axis 18A of FIG. 1. Double acting cylinder 376 is disposed in a rectangular beam 378 which is, in turn, disposed between cross-members 344A and 344B. Double acting cylinder 376 operates as disclosed above. Rectangular beam 378 replaces channel members 169A and 169B that are shown in FIG. 1. The structure of rectangular beam 378 is identical to rectangular beam 380.

Many modifications and variations may be made in the techniques and structures described and illustrated herein without departing from the spirit and scope of the present invention. For example, while the foregoing preferred embodiments use four lifting columns 22A–D, it should be understood that, alternatively, only two lifting columns positioned at the midpoint of the main frame 12 could be used. Likewise, while the fluidic cylinders disclosed herein are preferably hydraulic, they may alternatively be pneumatically actuated. Similarly, while the operation of the apparatus disclosed herein is in the context of heat exchanger tube bundle extraction, it should be understood that tube bundle extractor 10 may be used to remove and transport other heavy elongated objects. Accordingly, the techniques and structures described and illustrated herein should be understood to be illustrative only and not limiting upon the scope of the present invention.

What is claimed:

1. A lifter for transporting an elongated object over a surface, comprising:

an elongated main frame having at least two lifting columns vertically disposed in spaced apart relation;

at least four wheels pivotally coupled to said main frame, said wheels being controllably operable to propel and steer said lifter and to remain in contact with said surface;

an extraction frame coupled to said lifting columns and being controllably moveable with respect to said main frame along a first predetermined path, a second predetermined path, and a third predetermined path;

a pulling device being controllably moveable along a fourth predetermined path parallel to said first predetermined path to selectively pull said object onto and push said object off of said extraction frame.

2. The apparatus of claim 1 wherein a translating mechanism is coupled to said extraction frame, said translating mechanism being operable to translate said extraction frame parallel to said first predetermined path.

3. The apparatus of claim 1 wherein each said column comprises a fluidic cylinder vertically disposed within a plurality of concentrically disposed posts, said posts being capable of vertical movement relative to one another, said fluidic cylinder having an extendable rod coupled to the outermost of said posts such that when said rod is extended, said posts rise telescopically.

4. A lifter for transporting an elongated object over a surface, comprising:

an elongated main frame having a pair of parallel beams extending generally parallel to an X-axis, at least one cross-member coupled to said beams and extending generally parallel to a Y-axis, and at least two parallel lifting columns coupled to said beams and extending generally parallel to a Z-axis;

at least four wheels pivotally coupled to said main frame, said wheels being controllably operable to pivot 360° and to translate said lifter and to remain in contact with said surface;

an extraction frame slidably coupled to said lifting columns to permit translation of said extraction frame parallel to said Z-axis, said extraction frame having first and second parallel members extending generally parallel to said X-axis, and a plurality of parallel spars disposed on said extraction frame and extending generally parallel to said Y-axis, said parallel members being controllably moveable parallel to said Y-axis and controllably moveable parallel to said X-axis;

a pulling car slidably mounted on said parallel members of said extraction frame, said pulling car having an interior and being controllably moveable parallel to said X-axis to selectively pull said object onto and push said object off of said extraction frame;

a lifting mechanism coupled to said main frame, said lifting mechanism being controllably operable to translate said extraction frame parallel to said Z-axis;

a drive mechanism having a drive shaft coupled to said pulling car and to said extraction frame, said drive mechanism being controllably operable to translate said pulling car parallel to said X-axis;

a first translating mechanism coupled to said extraction frame, said first translating mechanism being operable to translate said parallel members parallel to said Y-axis; and a second translating mechanism coupled to said extraction frame, said second translating mechanism being operable to translate said parallel members parallel to said X-axis.

5. The apparatus of claim 4 wherein said lifting mechanism comprises:

a rotatable sheave mounted on each of said lifting columns;

a tension member rollably disposed on each of said sheaves, each said tension member having a first end coupled to one of said lifting columns and a second end coupled to said extraction frame; and at least one fluidic cylinder coupled to each said lifting column, each said cylinder having a rod extendable and retractable therefrom and coupled to its respective sheave, said fluidic cylinder being operable to selectively raise or lower said respective sheave to raise or lower said extraction frame.

6. The apparatus of claim 5, wherein said tension members comprise leaf chains.

7. The apparatus of claim 5, wherein said tension members comprise metallic cables.

8. The apparatus of claim 4 wherein said first translating mechanism comprises:

a first fluidic actuator coupled to one of said parallel spars, said first fluidic actuator having a selectively extendable and retractable first rod coupled to a first pair of lugs so that the first of said first pair of lugs may contact said first parallel member when said first rod is extended and the said second of said first pair of lugs may contact said second parallel member when said first rod is retracted; and a second fluidic actuator coupled to another of said parallel spars, said second fluid actuator having a selectively extendable and retractable second rod coupled to a second pair of lugs so that the first of said second pair of lugs may contact said first parallel member when said second rod is extended and the second of said second pair of lugs may contact said second parallel member when said second rod is retracted to selectively translate said parallel members parallel to said Y-axis.

9. The apparatus of claim 8 wherein said drive shaft comprises a worm gear.

10. The apparatus of claim 4 wherein said drive mechanism comprises:

said drive shaft having an outer surface and being rigidly coupled to said extraction frame and disposed parallel to said X-axis;

a rotating mechanism having an interior, and first and second modes of operation, said rotating mechanism being coupled to said pulling car, said rotating mechanism being operable to selectively rotate clockwise or counterclockwise; and said drive shaft passing through said rotating mechanism, said outer surface of said drive shaft being in engagement with said interior of said rotating mechanism, so that said pulling car translates in one direction parallel to said X-axis when said rotating mechanism is actuated in said first mode of operation and said pulling car translates in a second and opposite direction when said rotating mechanism is actuated in said second mode of operation.

11. The apparatus of claim 10 wherein said drive shaft is a ball screw.

12. The apparatus of claim 4, wherein said drive mechanism, comprised of said drive shaft, is rotatably coupled to said extraction frame and disposed parallel to said X-axis, said drive shaft passing through and engaging the interior of said pulling car, said drive shaft being coupled to a motor capable of rotating said drive shaft to translate said pulling car parallel to said X-axis when said drive shaft is rotated.

13. The apparatus of claim 12 wherein said drive shaft is a ball screw.

14. The apparatus of claim 4 wherein said pulling car comprises:

an upper half adapted to be coupled to said elongated objected; and a lower half pivotally coupled to said upper half, said lower half being coupled to said drive shaft.

15. The apparatus of claim 14 wherein said lower half is coupled to said drive shaft by way of a ball jack coupled to said lower half.

16. The apparatus of claim 4 wherein said second translating mechanism comprises:

a first fluidic actuator coupled to one of said parallel spars and having a first rod being selectively extendable and retractable therefrom parallel to said X-axis and operable to bear against another of said parallel spars to propel said parallel members in a first direction parallel to said X-axis; and a second fluidic actuator coupled to one of said parallel spars and having a second rod being selectively extendable and retractable therefrom parallel to said X-axis and operable to bear against another of said parallel spars to propel said parallel members in a second direction opposite to said first direction.

17. The apparatus of claim 4 wherein said second translating mechanism comprises:

a first fluidic actuator coupled to one of said parallel spars and having a first rod being selectively extendable and retractable therefrom parallel to said X-axis, said first rod being coupled to one of said parallel members; and a second fluidic actuator coupled to said parallel spar and having a second rod being selectively extendable and retractable therefrom parallel to said X-axis, said second rod being coupled to the other of said parallel members.

18. The apparatus of claim 4 wherein each said lifting column comprises a fluidic cylinder vertically disposed within a plurality of concentrically disposed posts said posts being capable of vertical movement relative to one another, said fluidic cylinder having an extendable rod coupled to the outermost of said posts such that when said rod is extended, said outer posts rise telescopically.

* * * * *